US011190581B1

(12) United States Patent
Tai

(10) Patent No.: US 11,190,581 B1
(45) Date of Patent: Nov. 30, 2021

(54) JOB ALLOCATION SUPPORT SYSTEM AND METHOD

(71) Applicant: Hitachi, Ltd., Tokyo (JP)

(72) Inventor: Kensuke Tai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/206,921

(22) Filed: Mar. 19, 2021

(30) Foreign Application Priority Data

May 13, 2020 (JP) .............................. JP2020-084406

(51) Int. Cl.
*H04L 29/08* (2006.01)

(52) U.S. Cl.
CPC ...... *H04L 67/1008* (2013.01); *H04L 67/1012* (2013.01); *H04L 67/36* (2013.01)

(58) Field of Classification Search
CPC . H04L 67/1008; H04L 67/1012; H04L 67/36; G06F 9/5027; G06F 9/5088
See application file for complete search history.

(56) References Cited

U.S. PATENT DOCUMENTS

| | | | | |
|---|---|---|---|---|
| 10,841,236 B1* | 11/2020 | Jin | ........................ | G06F 9/5072 |
| 2006/0167984 A1* | 7/2006 | Fellenstein | ...... | G06Q 10/06375 |
| | | | | 709/203 |
| 2009/0319662 A1* | 12/2009 | Barsness | ................. | G06F 9/505 |
| | | | | 709/226 |
| 2012/0109705 A1* | 5/2012 | Belady | .................. | G06F 1/3203 |
| | | | | 705/7.22 |
| 2014/0019613 A1* | 1/2014 | Ishikawa | ............. | G06F 11/3442 |
| | | | | 709/224 |
| 2014/0164620 A1 | 6/2014 | Tamura | | |
| 2018/0052709 A1* | 2/2018 | Fong | ..................... | G06F 9/5044 |
| 2018/0113742 A1* | 4/2018 | Chung | .................. | G06F 9/5005 |

FOREIGN PATENT DOCUMENTS

JP 2013069237 A 4/2013

* cited by examiner

*Primary Examiner* — Tonia L Dollinger
*Assistant Examiner* — Ishrat Rashid
(74) *Attorney, Agent, or Firm* — Procopio, Cory, Hargreaves & Savitch LLP

(57) ABSTRACT

A system periodically or non-periodically performs allocation optimization support processing (that supports optimization of job allocation) based on monitoring result information (that indicates a result of monitoring of one or a plurality of jobs allocated to one or more servers). The allocation optimization support processing includes: determining, for each job based on the monitoring result information, a job characteristic compatible with resource use rates of various calculation resources in an allocation target server of the job; and selecting, when there is a job that matches a condition that change of the allocation target server is recommended, an allocation target server of the job after the change from among one or more servers having a server characteristic compatible with the job characteristic of the job based on at least one of an execution duration length and resource use rates of various calculation resources of the job, and a use cost of each of the one or more servers.

11 Claims, 19 Drawing Sheets

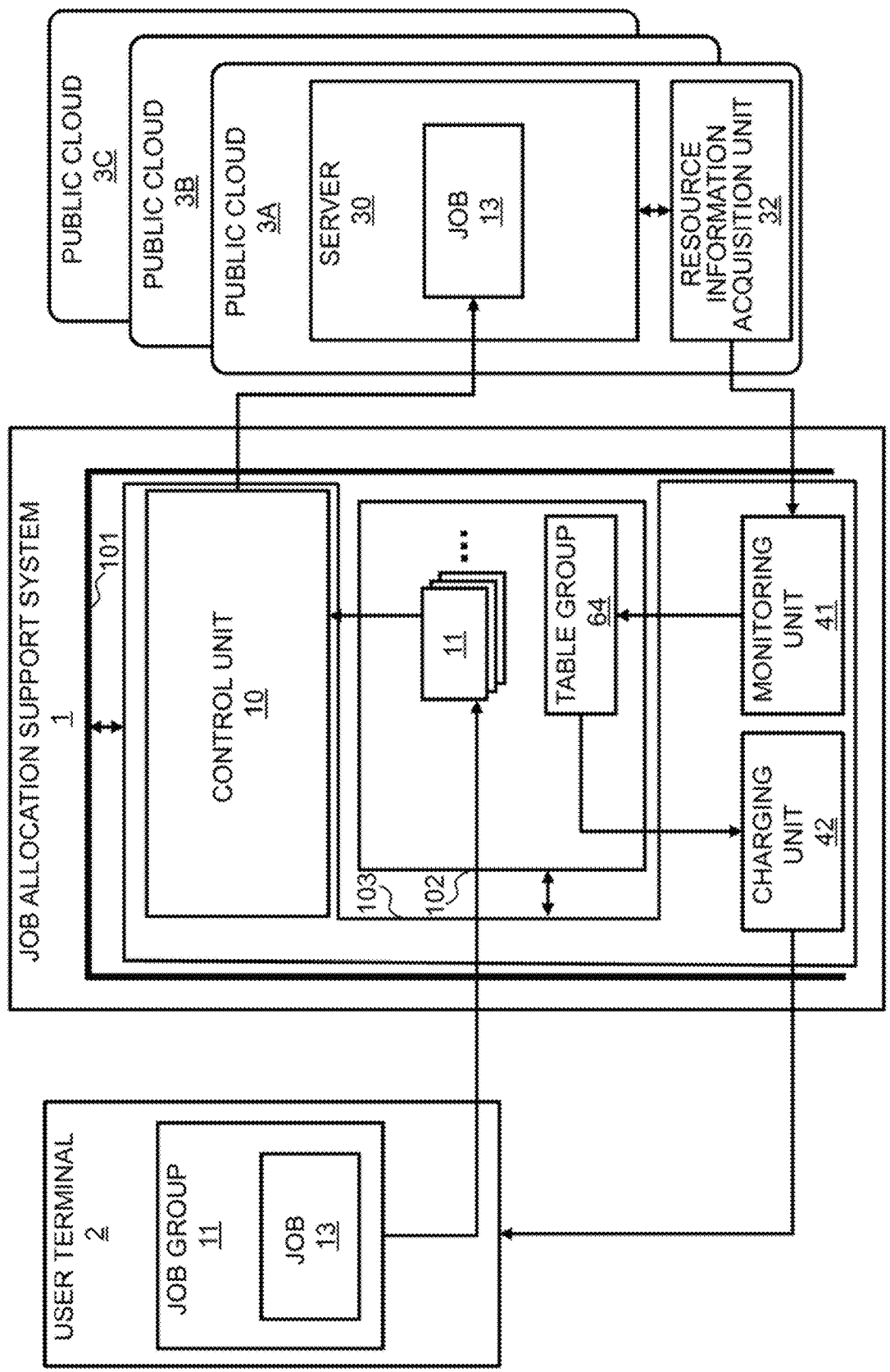

FIG. 2

MONITORING RESULT TABLE
200

| SERVER NAME (201) | SERVER TYPE (202) | RESOURCE TYPE (203) | JOB NAME (204) | RESOURCE USE RATE(%) (205) | | |
|---|---|---|---|---|---|---|
| | | | | 19:00 | 19:01 | ... |
| SV1 | GENERAL-PURPOSE 1 | CPU | JobA | 10 | - | ... |
| | | | JobB | 60 | 60 | ... |
| | | | JobC | - | 30 | ... |
| | | | JobD | - | - | ... |
| | | MEMORY | JobA | 10 | - | ... |
| | | | JobB | 5 | 5 | ... |
| | | | JobC | - | 15 | ... |
| | | | JobD | - | - | ... |
| | | DRIVE | JobA | 10 | - | ... |
| | | | JobB | 20 | 20 | ... |
| | | | JobC | - | 40 | ... |
| | | | JobD | - | - | ... |
| ... | ... | ... | ... | ... | ... | ... |

FIG. 3

JOB CHARACTERISTIC TABLE
300

| CPU (301) | MEMORY (302) | DRIVE (303) | JOB CHARACTERISTIC (304) | SERVER CHARACTERISTIC (305) |
|---|---|---|---|---|
| 1 | 1 | 1 | GENERAL-PURPOSE | GENERAL-PURPOSE |
| 1 | 1 | 2 | DRIVE-INTENSIVE TYPE | DRIVE-SPECIALIZED |
| ... | ... | ... | ... | ... |
| 2 | 1 | 2 | GENERAL-PURPOSE | GENERAL-PURPOSE |
| ... | ... | ... | ... | ... |
| 2 | 3 | 2 | MEMORY-INTENSIVE TYPE | MEMORY-SPECIALIZED |
| ... | ... | ... | ... | ... |
| 3 | 2 | 2 | CPU-INTENSIVE TYPE | CPU-SPECIALIZED |
| 3 | 2 | 3 | GENERAL-PURPOSE | GENERAL-PURPOSE |
| ... | ... | ... | ... | ... |

FIG. 4

SERVER MANAGEMENT TABLE
400

| SERVER CHARACTERISTIC (401) | SERVER TYPE (402) | CPU (403) | MEMORY (GiB) (404) | DRIVE (IOPS) (405) | USE COST (USD/H) (406) |
|---|---|---|---|---|---|
| GENERAL-PURPOSE | GENERAL-PURPOSE1 | 2 | 8 | 18,750 | 0.216 |
| | GENERAL-PURPOSE2 | 4 | 16 | 18,750 | 0.432 |
| | ... | ... | ... | ... | ... |
| CPU-SPECIALIZED | CPU-SPECIALIZED1 | 2 | 4 | 20,000 | 0.199 |
| | CPU-SPECIALIZED2 | 4 | 8 | 20,000 | 0.398 |
| | ... | ... | ... | ... | ... |
| MEMORY-SPECIALIZED | MEMORY-SPECIALIZED1 | 2 | 16 | 18,750 | 0.244 |
| | MEMORY-SPECIALIZED2 | 4 | 32 | 18,750 | 0.488 |
| | ... | ... | ... | ... | ... |
| DRIVE-SPECIALIZED | DRIVE-SPECIALIZED1 | 2 | 16 | 35,000 | 0.275 |
| | DRIVE-SPECIALIZED2 | 4 | 32 | 70,000 | 0.55 |
| | ... | ... | ... | ... | ... |

FIG. 5

DURATION PREDICTION TABLE
500

| SERVER CHARACTERISTIC | SERVER TYPE | EXECUTION DURATION LENGTH | | | |
|---|---|---|---|---|---|
| | | GENERAL-PURPOSE | CPU-INTENSIVE TYPE | MEMORY-INTENSIVE TYPE | DRIVE-INTENSIVE TYPE |
| GENERAL-PURPOSE | GENERAL-PURPOSE1 | 00:05:00 | 00:05:30 | 00:05:10 | 00:05:50 |
| | ... | ... | ... | ... | ... |
| CPU-SPECIALIZED | CPU-SPECIALIZED1 | 00:05:00 | 00:04:20 | 00:05:00 | 00:04:50 |
| | ... | ... | ... | ... | ... |
| MEMORY-SPECIALIZED | MEMORY-SPECIALIZED1 | ... | ... | ... | ... |
| | ... | ... | ... | ... | ... |
| DRIVE-SPECIALIZED | DRIVE-SPECIALIZED1 | ... | ... | ... | ... |

501  502  503

| SERVER NAME | SERVER TYPE | RESOURCE TYPE | JOB NAME | RESOURCE USE RATE(%) | | |
|---|---|---|---|---|---|---|
| | | | | FEB. 21, 2020 | FEB. 22, 2020 | ... |
| SV1 | GENERAL-PURPOSE SERVER1 | CPU | JobA | 10 | - | ... |
| | | | JobB | 50 | 60 | ... |
| | | | JobC | 35 | 30 | ... |
| | | | JobD | 58 | - | ... |
| ... | ... | ... | ... | ... | ... | ... |

FIG. 9

| SERVER NAME | SERVER TYPE | RESOURCE TYPE | JOB NAME | RESOURCE USE RATE(%) | | |
|---|---|---|---|---|---|---|
| | | | | FEB. 21, 2020 | FEB. 22, 2020 | ... |
| SV2 | GENERAL-PURPOSE SERVER2 | CPU | JobA | 5 | 6 | ... |
| | | | JobD | 30 | 31 | ... |
| | | | JobE | 10 | 11 | ... |
| | | | JobF | 21 | 26 | ... |
| | | | ... | ... | ... | ... |

FIG. 10

| JOB NAME | RESOURCE TYPE | RESOURCE USE RATE(%) | | | | AVERAGE RESOURCE USE RATE(%) |
|---|---|---|---|---|---|---|
| | | SV1 (BEFORE) | SV1 (AFTER) | SV2 (BEFORE) | SV2 (AFTER) | |
| JobD | CPU | 58 | 66 | 30 | 60 | 63 |
| | MEMORY | 20 | 23 | 10 | 20 | 21 |
| | DRIVE | 10 | 11 | 10 | 20 | 16 |

| JOB NAME | JOB CHARACTERISTIC | CHANGE RECOMMENDATION FLAG |
|---|---|---|
| JobA | GENERAL-PURPOSE | 0 |
| JobB | CPU-INTENSIVE TYPE | 1 |
| JobC | DRIVE-INTENSIVE TYPE | 0 |
| JobD | CPU-INTENSIVE TYPE | 1 |

FIG. 16

COST PERFORMANCE SELECTION SCREEN

TARGET JOB NAME : JobD

SELECT COST PERFORMANCE
- ● COST-FOCUSED  1600
- ○ PERFORMANCE-FOCUSED  1700
- ○ CUSTOMIZATION  1800

COST-FOCUSED ――― PERFORMANCE-FOCUSED

|  | BEFORE CHANGE | AFTER CHANGE (PREDICTION) |
|---|---|---|
| EXECUTION DURATION LENGTH | 00:05:00 | 00:07:00 |
| USE COST | 10,000 | 7,000 |

[ OK ]  [ CANCEL ]

FIG. 17

COST PERFORMANCE SELECTION SCREEN

TARGET JOB NAME : JobD

SELECT COST PERFORMANCE
- ○ COST-FOCUSED  1700
- ● PERFORMANCE-FOCUSED  1800
- ○ CUSTOMIZATION

COST-FOCUSED ――― PERFORMANCE-FOCUSED

|  | BEFORE CHANGE | AFTER CHANGE (PREDICTION) |
|---|---|---|
| EXECUTION DURATION LENGTH | 00:05:00 | 00:03:00 |
| USE COST | 10,000 | 15,000 |

[ OK ]  [ CANCEL ]

FIG. 20

JOBNET CONFIGURATION TABLE
2000

| JOBNET NAME (2001) | JOB NAME (2002) | SUBSEQUENT JOB NAME (2003) |
|---|---|---|
| Jobnet1 | JobA | JobB |
| | JobB | JobC, JobD |
| | JobC | - |
| | JobD | - |
| Jobnet2 | JobA | JobD, JobE, JobF |
| | JobD | - |
| | JobE | - |
| | JobF | - |
| ... | ... | ... |

FIG. 21

JOBNET EXECUTION DURATION LENGTH TABLE
2100

| JOBNET NAME (2101) | PATH# (2102) | JOB ORDER (2103) | PATH EXECUTION DURATION LENGTH (2104) |
|---|---|---|---|
| Jobnet1 | 1 | JobA, JobB, JobC | 00:10:00 |
| | 2 | JobA, JobB, JobD | 00:13:00 |
| Jobnet2 | 1 | JobA, JobB | 00:08:00 |
| | 2 | JobA, JobC | 00:07:00 |
| | 3 | JobA, JobD | 00:10:00 |
| ... | ... | ... | ... |

| JOBNET NAME | JOB NAME | JOB CHARACTERISTIC | CHANGE-POSSIBLE FLAG |
|---|---|---|---|
| Jobnet1 | JobA | GENERAL-PURPOSE | 1 |
| | JobB | CPU-INTENSIVE TYPE | 1 |
| | JobC | DRIVE-INTENSIVE TYPE | 2 |
| | JobD | CPU-INTENSIVE TYPE | 1 |

FIG. 28

COST PERFORMANCE SELECTION SCREEN

TARGET JOB NAME : Jobnet1

SELECT COST PERFORMANCE

☑ SPECIFY COST PERFORMANCE

| COST-FOCUSED — PERFORMANCE-FOCUSED | | BEFORE CHANGE | AFTER CHANGE (PREDICTION) |
|---|---|---|---|
| 2850   2851 | EXECUTION DURATION LENGTH | 00:13:00 | 00:11:00 |
| ☐ COST OPTIMIZATION | USE COST | 20,000 | 22,000 |

[CHANGE DETAILS]

[OK] [CANCEL]

FIG. 29

COST PERFORMANCE SELECTION SCREEN

TARGET JOB NAME : Jobnet1

SELECT COST PERFORMANCE

☑ SPECIFY COST PERFORMANCE

| COST-FOCUSED — PERFORMANCE-FOCUSED | | BEFORE CHANGE | AFTER CHANGE (PREDICTION) |
|---|---|---|---|
| | EXECUTION DURATION LENGTH | 00:13:00 | 00:11:00 |
| ☑ COST OPTIMIZATION | USE COST | 20,000 | 20,000 |

[CHANGE DETAILS]

[OK] [CANCEL]

JOB ALLOCATION SUPPORT SYSTEM AND METHOD

CROSS-REFERENCE TO PRIOR APPLICATION

This application relates to and claims the benefit of priority from Japanese Patent Application number 2020-84406, filed on May 13, 2020 the entire disclosure of which is incorporated herein by reference.

BACKGROUND

The present invention generally relates to job allocation support.

In accordance with a user program (UP) execution instruction from a user, a system disclosed in Reference 1 executes UP processing at a target server of a target public cloud among a plurality of public clouds and performs charging calculation processing for the user.

Reference 1: JP2013-69237

SUMMARY

Processing execution can be achieved by executing one or a plurality of jobs at one or a plurality of servers.

With the technology of Reference 1, a user can specify an allocation target (execution target) server of a job.

However, it is difficult for the user to specify a server that is optimum for a job characteristic and an execution duration length of the job, and as a result, it is difficult to achieve optimum cost performance of processing. One of the reasons is that it is difficult for the user to accurately understand the job characteristic of the job in advance.

A system monitors one or a plurality of jobs allocated to one or more servers and periodically or non-periodically performs allocation optimization support processing (that supports optimization of job allocation) based on monitoring result information (that indicates a result of the monitoring). Each of the one or plurality of jobs uses, for execution of the job, one or more kinds of calculation resources included in an allocation target server of the job among a plurality of servers. The monitoring result information includes, for each of the one or plurality of jobs, information that indicates a resource use rate of each of the one or more kinds of calculation resources included in the allocation target server of the job and used for execution of the job per duration. The allocation optimization support processing includes: determining, for each of the one or plurality of jobs based on the monitoring result information, a job characteristic compatible with the resource use rate of each of the one or more kinds of calculation resources used by the job in the allocation target server of the job; and selecting, when there is a target job that matches a condition that the allocation target server of the job is recommended to be changed, an allocation target server of the target job after the change from among one or more servers each having a server characteristic compatible with the determined job characteristic of the target job based on at least one of an execution duration length and resource use rates of various calculation resources, which are specified for the target job based on the monitoring result information, a use cost of each of the one or more servers, and resource amounts of various calculation resources in each of the one or more servers.

According to the present invention, it is possible to maintain optimum cost performance of processing.

BRIEF DESCRIPTION OF THE DRAWINGS

FIG. 1 illustrates an exemplary entire configuration of a system including a job allocation support system according to a first embodiment;

FIG. 2 illustrates an exemplary configuration of a monitoring result table;

FIG. 3 illustrates an exemplary configuration of a job characteristic table;

FIG. 4 illustrates an exemplary configuration of a server management table;

FIG. 5 illustrates an exemplary configuration of a duration prediction table;

FIG. 9 illustrates an exemplary result of S703 in FIG. 7;

FIG. 10 illustrates an exemplary result of S705 in FIG. 7;

FIG. 16 illustrates an exemplary cost performance selection screen according to the first embodiment;

FIG. 17 illustrates the exemplary cost performance selection screen according to the first embodiment;

FIG. 20 illustrates an exemplary configuration of a jobnet configuration table;

FIG. 21 illustrates an exemplary configuration of a jobnet execution duration length table;

FIG. 28 illustrates an exemplary cost performance selection screen according to the second embodiment;

FIG. 29 illustrates the exemplary cost performance selection screen according to the second embodiment.

DESCRIPTION OF EMBODIMENTS

Figure 6:
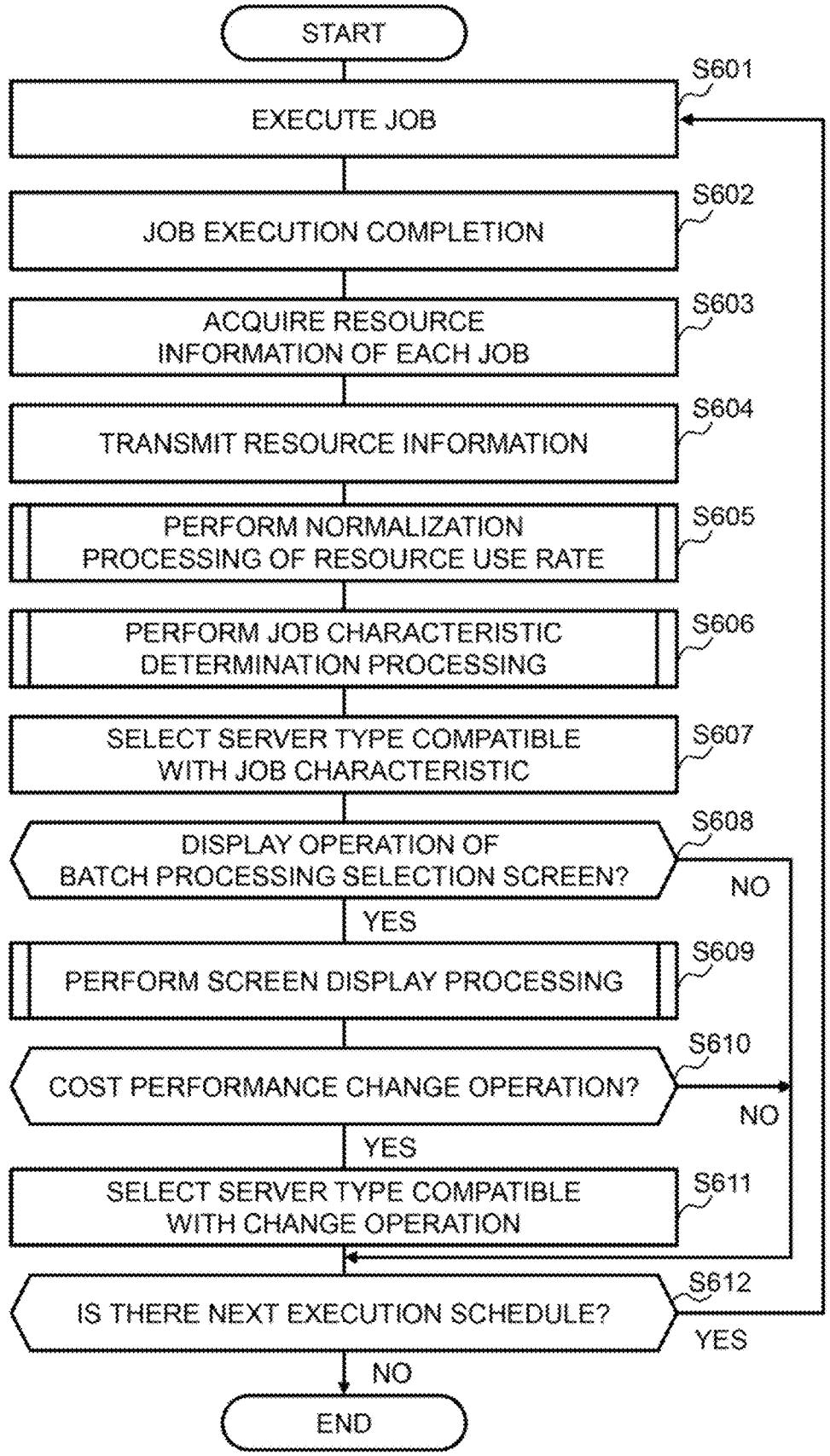
FIG. 6 illustrates an exemplary entire process of processing including job execution.

In the following description, an "interface apparatus" may be one or more interface devices. The one or more interface devices may be at least one of those listed below:

One or more input/output (I/O) interface devices. Each input/output. (I/O) interface device is an interface device for at least one of an I/O device and a remote display computer. The I/O interface device for the display computer may be a communication interface device. At least one I/O device may be a user interface device, for example, any of an input device such as a keyboard or a pointing device, or an output device such as a display device.

One or more communication interface devices. The one or more communication interface devices may be one or more communication interface devices (for example, one or more network interface cards (NICs)) of the same kind or may be communication interface devices of two or more of different kinds (for example, a NIC and a host bus adapter (HBA)).

In the following description, a "memory" is one or more memory devices as one or more exemplary storage devices and may be typically a main storage device. At least one of the memory devices as the memory may be a transitory memory device or a non-transitory memory device.

In the following description, a "permanent storage apparatus" may be one or more permanent storage devices as one or more exemplary storage devices. Each permanent storage device may be typically a non-transitory storage device (fox example, an auxiliary storage device), and specifically, may be, for example, a hard disk drive (ODD), a solid state drive (SSD), a non-volatile memory express (NVME) drive, or a storage class memory (SCM).

In the following description, a "storage apparatus" may be at least a memory of the memory and a permanent storage apparatus.

In the following description, a "processor" may be one or more processor devices. At least one of the processor devices may be typically a micro-processor device such as a central processing unit (CPU) but may be another type of processor device such as a graphics processing unit (GPU). At least one of the processor devices may be a single-core processor device or a multi-core processor device. At least one of the processor devices may be a processor core. At least one of the processor devices may be a broad-sense processor device such as a circuit (for example, a field-programmable gate array (FPGA), a complex programmable logic device (CPLD), or an application specific integrated circuit (ASIC)) as a gate array assembly that performs part or all of processing by a hardware description language.

In the following description, a function is expressed as a "yyy unit" in some cases, but the function may be achieved by a processor executing one or more computer programs, may be achieved by one or more hardware circuits (for example, FPGA or ASIC), or may be achieved by a combination thereof. When the function is achieved by a processor executing a computer program, determined processing is performed by using a storage apparatus, an interface apparatus, and/or the like as appropriate, and thus the function may be at least part of the processor. Processing described with the function as a subject may be processing performed by a processor or an apparatus including the processor. The computer program may be installed from a computer program source. The computer program source may be, for example, a computer program distribution computer or a computer-readable recording medium (for example, a non-temporary recording medium). Description of each function is exemplary, and a plurality of functions may be integrated as one function, or one function may be divided into a plurality of functions.

In the following description, information from which an output can be obtained in response to an input is expressed as an "xxx table" in some cases, but the information may be data of any structure (for example, structured data or unstructured data) or may be a neural network, a genetic algorithm, or a learning model such as a random forest, which generate an output in response to an input. Thus, an "xxx table" may be referred to as "xxx information". In the following description, the configuration of each table is exemplary, and one table may be divided into two or more tables, or the entire or part of two or more tables may be one table.

In the following description, a name or a number is employed as "identification information" of each component, but other types of information (for example, an ID) may be employed in place of or in addition to the name.

In the following description, a sign common to reference signs of components of the same kind is used when the components are not distinguished from each other, but the reference signs are used when the components are distinguished from each other, in some cases.

Some embodiments will be described below.

First Embodiment

FIG. 1 illustrates an exemplary entire configuration of a system including a job allocation support system according to a first embodiment.

A job allocation support system 1 supports allocation of one or a plurality of jobs 13 included in a job group 11 from a user terminal 2 to one or more servers 30 among a plurality of servers 30. In the present embodiment, the job group 11 is one job 13. Although there are typically a plurality of users and a plurality of user terminals 2, the present embodiment describes an example with one user and one user terminal 2 for simplification.

The plurality of servers 30 may be a plurality of cloud computing services provided by a plurality of public clouds 3 (for example, 3A to 3C). One or more servers 30 are provided by each public cloud 3. Each server 30 includes some (or all) types of calculation resources in a calculation resource group (a plurality of calculation resources including a plurality of types of calculation resources) of a public cloud 3 that provides the server 30. In other words, a plurality of types of calculation resources in a cloud infrastructure (calculation resource group) of the public cloud 3 that provides the server 30 are allocated to the server 30. The server 30 executes a job 13 allocated to the server 30. Each job 13 uses, for execution of the job 13, one or more types of calculation resources included in an allocation target server 30 of the job 13. The plurality of servers 30 have different use costs. For example, the use cost (for example, a use amount per unit duration) of each server 30 depends on at least one of specifications (for example, resource amounts of various resources) of the server 30 and a public cloud 3 that provides the server 30.

The job allocation support system 1 is a computer system constituted by one or more physical computers but may be a system achieved based on a plurality of types of calculation resources included in the computer system. The job allocation support system 1 includes an interface apparatus 101, a storage apparatus 102, and a processor 103 coupled with the interface apparatus 101 and the storage apparatus 102. Communication between the user terminal 2 and each public cloud 3 is performed through the interface apparatus 101. The storage apparatus 102 stores a computer program group (one or more computer programs), a table group 64 (one or more tables), and the job group 11 provided by the user terminal 2. A monitoring unit 41, a control unit 10, and a charging unit 42 are achieved by the processor 103 executing the computer program group. The job group 11 is stored in the storage apparatus 102 by, for example, the control unit 10.

The monitoring unit 41 monitors the one or plurality of jobs 13 allocated to one or more of the plurality of servers 30. Specifically, for example, a resource information acquisition unit 32 is executed at each public cloud 3. The resource information acquisition unit 32 at each public cloud 3 acquires resource information of the public cloud 3. The "resource information" of each public cloud 3 includes, for each server 30 in the public cloud 3, information that indicates the server name of the server 30, the job name of any job 13 executed at the server 30, the type of any used calculation resource, and the resource use rate of the calculation resource. The "monitoring" performed by the monitoring unit 41 includes periodically or non-periodically performing reception of the resource information from the resource information acquisition unit 32 of each public cloud 3 and registration of the received resource information to the table group 64.

The control unit 10 refers to information (information registered in the table group 64) that indicates a result of the monitoring of the one or a plurality of jobs 13, and periodically or non-periodically performs, based on the information, allocation optimization support processing that supports optimization of job allocation. The information referred to by the control unit 10 includes, for each of the one or a plurality of jobs 13, information that indicates resource use rates per duration for one or more types of respective calculation resources included in the allocation target server 30 of the job 13 and used for execution of the job 13. The allocation optimization support processing includes:

determining, for each of the one or a plurality of jobs 13 based on the referred information, a job characteristic compatible with the resource use rate of each of one or more types of calculation resources used by the job 13 in the allocation target server 30 of the job 13; and selecting, when there is a target job 13 that matches a change recommendation condition (condition that the allocation target server is recommended to be changed), an allocation target server 30 of the target job 13 after the change from among one or more servers 30 each having a server characteristic compatible with the determined job characteristic of the target job 13 based on at least one of an execution duration length and the resource use rates of various calculation resources, which are specified for the target job 13 based on the above-described referred information, the use cost of each of the one or more servers 30, and the resource amounts of various calculation resources in each of the one or more servers 30.

As described above, the monitoring unit 41 periodically (or non-periodically) monitors each job 13, and the control unit 10 periodically (or non-periodically) performs the above-described allocation optimization support processing based on a result of the monitoring. Accordingly, a server 30 having a server characteristic compatible with the job characteristic of the job 13 and having optimum cost performance is selected as an allocation target of the job 13. When the job characteristic (specifically, for example, a resource use rate tendency) of the job 13 has changed, a server 30 having a server characteristic compatible with the job characteristic of the job 13 after the change and having optimum cost performance is selected as an allocation target of the job 13. In this manner, it is possible to maintain optimum cost performance of processing (processing achieved by execution of one or more jobs 13). In the present embodiment, each job 13 is allocated to the allocation target server 30 selected for the job 13 by the control unit 10, but instead, processing as follows may be performed. Specifically, the control unit 10 may notify the user terminal 2 of information (for example, URL) of the allocation target server 30 of at least one job 13, and the user terminal 2 may allocate the job 13 to the selected allocation target server 30 in accordance with the information.

The charging unit 42 calculates a charge amount of the user terminal 2 for the user based on information that indicates a monitoring result and information that indicates the use cost of each server 30, and performs charge billing of the calculated charge amount to the user terminal 2. The charge billing may be, for example, transmission of a mail on which the charge amount is written, or display of a WEB page on which the charge amount is written.

FIGS. 2 to 5 illustrate exemplary tables included in the table group 64. For example, as illustrated in FIG. 2, in the present embodiment, the types of calculation resources of each public cloud 3 are three types of CPU, memory, and drive. Another type (for example, interface) may be employed in place of or in addition to at least one of these types.

FIG. 2 illustrates an exemplary configuration of a monitoring result table.

This monitoring result table 200 is a table to which resource information is registered by the monitoring unit 41. The monitoring result table 200 stores, for each server 30, information such as a server name 201, a server type 202, a resource type 203, a job name 204, and a resource use rate 205. The following description will made on an example with one server 30 ("server of interest 30" in description of FIG. 2).

The server name 201 indicates the server name of the server of interest 30. The server type 202 indicates the server type of the server of interest 30. The resource type 203 indicates the type of calculation resource included in the server of interest 30. The job name 204 indicates the job name of a job allocated to the server of interest 30. The resource use rate 205 indicates a resource use rate for each duration. A "duration" means a unit duration such as one minute. A plurality of durations may be same or different. The resource use rate of "-" for each calculation resource indicates that the resource use rate is 0%, in other words, the calculation resource is not used. Execution of a job 13 means that the resource use rate of at least one type of calculation resource exceeds 0%. Thus, the execution duration length of a job 13 means the length of a duration in which the resource use rate of at least one type of calculation resource exceeds 0%.

FIG. 3 illustrates an exemplary configuration of a job characteristic table.

This job characteristic table 300 lists the correspondence relation among the ratio of the resource use rates of a plurality of resource types (a combination of a plurality of ratio terms corresponding to the plurality of respective resource types), a job characteristic, and a server characteristic compatible with the job characteristic. For example, the job characteristic table 300 stores, for each ratio of the resource use rates, information such as a CPU 301, a memory 302, a drive 303, a job characteristic 304, and a server characteristic 305. The following description will be made on an example with one ratio ("ratio of interest" in description of FIG. 3). A "drive" is an exemplary permanent storage device may be, for example, a HDD or a SSD.

The CPU 301, the memory 302, and the drive 303 correspond to ratio terms included in the ratio of interest. For example, the ratio is 1:1:1 when the resource use rate of the CPU is 10%, the resource use rate of the memory is 10%, and the resource use rate of the drive is 10%. When the value of any term is not an integer, an approximate integer is employed.

The job characteristic 304 indicates a job characteristic corresponding to the ratio of interest. The job characteristic 304 can be roughly classified into a first type characteristic specialized for a resource type having a value that is largest and not equal to any other value in the ratio, and a second type characteristic specialized for a resource type having a value that is largest and equal to another value in the ratio. The first type characteristic is, for example, "CPU-intensive type", which means that the value (resource use rate) of the CPU is largest and not equal to any other values in the ratio, "memory-intensive type", which means that the value of the memory is largest and not equal to any other values in the ratio, or "drive-intensive type", which means that the value of the drive is largest and not equal to any other values in the ratio. The second type characteristic is, for example, "general-purpose", which means that a value is largest and equal to another value in the ratio.

The server characteristic 305 indicates a server characteristic compatible with the job characteristic 304 corresponding to the ratio of interest. The server characteristic 305 is, for example, "CPU-specialized", which is compatible with the job characteristic "CPU-intensive type", "memory-specialized", which is compatible with the job characteristic "memory-intensive type", "drive-specialized", which is compatible with the job characteristic "drive-intensive type", or "general-purpose", which is compatible with the job characteristic "general-purpose".

FIG. 4 illustrates an exemplary configuration of a server management table.

This server management table 400 lists the server characteristic, server type, specifications (resource amounts of various calculation resources), and use cost of each server 30. For example, the server management table 400 stores, for each server 30, information such as a server characteristic 401, a server type 402, a CPU 403, a memory 404, a drive 405, and a use cost 406. The following description will be made on an example with one server 30 ("server of interest 30" in description of FIG. 4).

The server characteristic 401 indicates the server characteristic of the server of interest 30. The server type 402 indicates the server type of the server of interest 30. The "server type" corresponds to a combination (pattern) of the server characteristic 401, the specifications, and the use cost. For example, the server type 402 for the server characteristic "general-purpose" is "general-purpose 1", "general-purpose 2", . . . , which depends on the specifications and the use cost. Thus, the "server type" can be regarded as a pattern of the server characteristic, specifications, use cost of the server.

The CPU 403, the memory 404, and the drive 405 indicate the specifications of the server of interest 30. Specifically, the CPU 403 indicates the number of CPUs (or CPU cores). The memory 404 indicates the capacity of the memory. The drive 405 indicates the maximum IOPS of the drive.

The use cost 406 indicates the use cost (Specifically, cost per the unit duration (for example, one hour)) of the server of interest 30.

FIG. 5 illustrates an exemplary configuration of a duration prediction table.

This duration prediction table 500 lists a predicted execution duration length of a job for each server type and each job characteristic. For example, the duration prediction table 500 stores information such a server characteristic 501, a server type 502, and an execution duration length 503. The following description will be made on an example with the server type ("server type of interest" in description of FIG. 5).

The server characteristic 501 indicates a server characteristic to which the server type of interest belongs. The server type 502 indicates the server type of interest. The execution duration length 503 indicates, for each job characteristic, an execution duration length that is predicted when it is assumed that a job 13 of the job characteristic is executed at a server 30 corresponding to the server type of interest.

The execution duration length 503 in the initial duration prediction table 500 may be information that indicates the execution duration length of a sample job of each job characteristic. The duration prediction table 500 may be updated in accordance with a monitoring result of each job 13. For example, when a job is executed at any one server 30 and the execution duration length of the job at the server 30 is monitored by the monitoring unit 41 and specified from the monitoring result table 200 by the control unit 10, the specified execution duration length may be overwritten to a corresponding execution duration length (execution duration length corresponding to the job characteristic of the job and the server type of the server 30) in the duration prediction table 500. Alternatively, the control unit 10 may acquire statistics of a pair of a server type and a job characteristic and an actual execution duration length in accordance with a monitoring result of each job 13 and may update the duration prediction table 500 based on the statistics.

Exemplary processing performed in the present embodiment will be described below. In the present embodiment, processing achieved by job execution is batch processing.

FIG. 6 illustrates an exemplary entire process of processing including job execution. The following description will be made on an example with one job 13 ("job of interest 13" in description of FIGS. 6 to 18).

The job of interest 13 is executed at an allocation target server 30 to which the job of interest 13 is allocated (S601). The execution of the job of interest 13 is completed (S602).

The resource information acquisition unit 32 of a public cloud 3 that provides the allocation target server 30 acquires resource information of the job of interest 13 (S603). The resource information includes information that indicates the server name of the allocation target server 30 of the job of interest 13, the job name of the job of interest 13, an execution time slot (for example, a start time and an end time) of the job of interest 13, and the resource use rates of various calculation resources per unit duration in the execution time slot.

The resource information acquisition unit 32 transmits the acquired resource information to the job allocation support system 1 (S604). The monitoring unit 41 of the job allocation support system 1 receives the resource information of the job of interest 13 and registers the resource information to a column corresponding to the server name in the resource information in the monitoring result table 200.

Accordingly, the resource use rates of various calculation resources per unit duration for the execution time slot of the job of interest 13 are registered to the monitoring result table 200.

The control unit 10 performs resource use rate normalization processing for the job of interest 13 (S605). Details of the normalization processing will be described later with reference to FIG. 7.

The control unit 10 performs job characteristic determination processing on the job of interest 13 (S606). Details of the job characteristic determination processing will be described later with reference to FIG. 11.

The control unit 10 specifies, based on the job characteristic table 300, a server characteristic compatible with a job characteristic specified at S606, and selects any one server type belonging to the specified server characteristic based on the server management table 400 and the various resource use rates of the job of interest 13, (S607). At S607, the server type selection may be performed in accordance with a predetermined policy. For example, the server type selected at S607 satisfies both conditions (p) and (q) below:

(p) The server type satisfies the condition (q) and has a lowest use cost among a plurality of server types having the specified server characteristic.

(q) The server type has a resource type of a resource amount smaller than that of the server type of the current allocation target server 30, but the resource amount is equal to or larger than an expected necessary resource amount of the resource type. The "expected necessary resource amount" of the resource type is a resource amount calculated based on the resource use rate (resource use rate specified based on the monitoring result table 200) of the job of interest 13 and a resource amount corresponding to the server type of the current allocation target server 30.

With such conditions (p) and (q), in the example illustrated in FIG. 4, the selected server type is "CPU-specialized 1" having a lowest use cost when the current server type is "general-purpose 1", the server characteristic specified at S607 is "CPU-specialized", and the resource use rate of the memory is "30%. This is because, for the memory, the resource amount "4" corresponding to "CPU-specialized 1" is smaller than the resource amount "8" corresponding to the current server type "general-purpose 1" but is equal to or larger than an expected necessary resource amount "2.4", which is calculated from the resource amount "8" and the resource use rate "30%.". As a result, it is expected that the use cost is adequately reduced while the resource amounts of all resource types are equal to or larger than respective expected necessary resource amounts.

The control unit 10 determines whether a display operation of a batch processing selection screen is received from the user terminal 2 (S608). When the determination at S608 is false (NO at S608), the process proceeds to S612. In the case of NO at S608, the control unit 10 may change the allocation target of the job of interest 13 to a server 30 belonging to the server type selected at S607. The allocation target of the job of interest 13 may not be changed when the server type selected at S607 is same as the server type of the current allocation target server 30.

When the determination at 3608 is true (YES at S608), the control unit 10 performs screen display processing (S609). Details of the screen display processing will be described later with reference to FIG. 13.

After S609, the control unit 10 determines whether a cost performance change operation is received from the user terminal 2 (3610). When the determination at S610 is false (NO at S610), the process proceeds to S612.

When the determination at 3610 is true (YES at S610), the control unit 10 selects a server type compatible with the contents of the cost performance change operation (S611). For example, when the contents of the cost performance change operation include an operation to change performance-focused to cost-focused, the control unit 10 refers to the server management table 400 and selects a server type having specifications lower than those (having a use cost lower than that) of the server type selected at S607 from among a plurality of server types belonging to the server characteristic selected at 3607. Thereafter, the process proceeds to S612. Between S611 and S612, the control unit 10 may change the allocation target of the job of interest 13 to a server 30 belonging to the server type selected at S611.

At S612, the control unit 10 determines whether the job of interest 13 (batch processing) has a next execution schedule. When the determination at S612 is true (YES at S612), the process returns to S601 for the job of interest 13. Accordingly, at the next execution, the job of interest 13 is executed at the allocation target server 30 after change, and the processing at S602 and later is performed.

In description of FIG. 6, in the case of NO at S608 or in the case of NO at S610, an execution duration length and a use cost that are predicted when the allocation target is a server belonging to the server type selected at S607 are not checked by the user, and the server type selected at S607 is determined as a server type corresponding to the job of interest 13. A server 30 belonging to the determined server type is set as the allocation target server 30 of the job of interest 13. Which server 30 belonging to the server type is set as the allocation target may be selected by the control unit 10 in accordance with a predetermined policy (for example, the server 30 may be randomly selected, or a server 30 having a lowest load as a whole may be selected).

In description of FIG. 6, the "selection of a server type" may correspond in effect to selection of a server 30 belonging to the server type as the allocation target server. Two or more servers 30 belonging to the selected server type may exist on an identical public cloud 3 or may dispersively exist at different public clouds 3. Which server 30 belonging to the selected server type is selected as the allocation target server 30 may be selected by the control unit 10 in accordance with loads (for example, averages of resource use rates specified based on the monitoring result table 200) of all servers 30 belonging to the server type.

The processing exemplarily illustrated in FIG. 6 may be separated into a plurality of pieces of processing. For example, the processing at S601 and S602 may be performed for each job. The processing at S603 and S604 may be periodically or non-periodically performed for each job. Accordingly, the resource information of each job may be acquired and registered to the monitoring result table 200. The processing at S605 to S612 may be periodically or non-periodically performed for all jobs. In this case, the frequency of the processing at S605 to S612 (job allocation target selection processing) may be lower than the frequency of the processing at S603 and S604 (job monitoring). In other words, the processing at S605 to S612 may be performed after a certain amount of resource information is accumulated in the job monitoring.

Figures 7, 8:
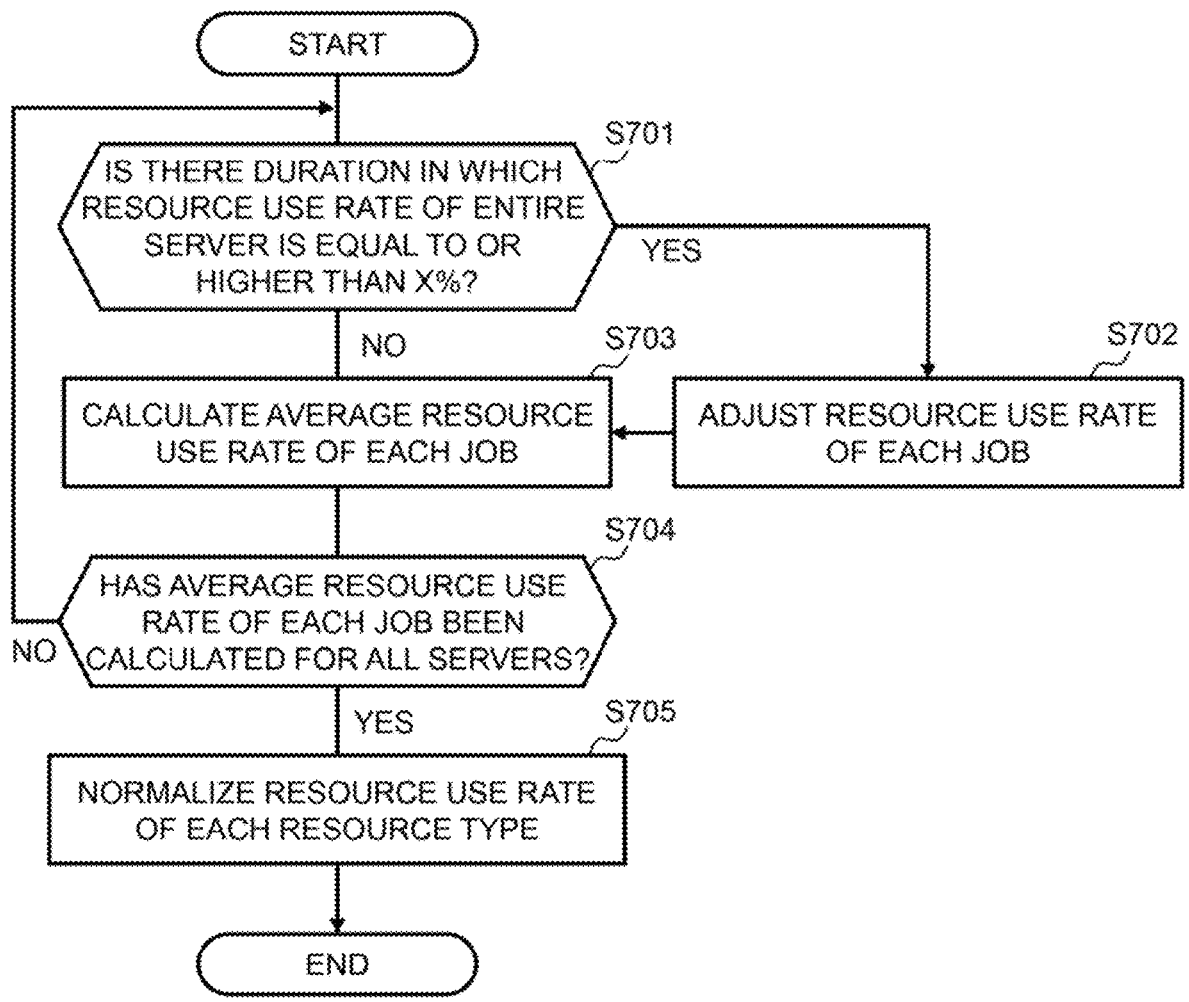
FIG. 7 illustrates an exemplary process of resource use rate normalization processing (S605 in FIG. 6)
FIG. 8 illustrates an exemplary result of S703 in FIG. 7.

FIG. 7 illustrates an exemplary process of the resource use rate normalization processing (S605 in FIG. 6).

The control unit 10 determines, based on the monitoring result table 200, whether there is a high-load duration in which the entire resource use rate of the allocation target server 30 of the job of interest 13 is equal to or higher than X % (0<X<100) (3701). The value of X is a value meaning that a load on the allocation target server 30 is high.

When the determination at S701 is true (YES at S201), the control unit 10 adjusts, for each high-load duration, the resource use rates of each job in accordance with the number of jobs simultaneously executed in the duration (S702). For example, the resource use rates after the adjustment may be resource use rates calculated based on weights in accordance with the number of simultaneously executed jobs, and the resource use rates of the job.

When the determination at 3701 is false (NO at S701) or after 3702, the control unit 10 calculates, for each of a plurality of jobs 13 including the job of interest 13, an average resource use rate of each resource type of each server type per duration (S703). The "duration" is a duration (for example, one day) longer than the duration (for example, one minute) in the monitoring result table 200. Although the average resource use rate is employed in this example, any other type of resource use rate such as the maximum or minimum value of each resource use rate for each duration may be employed.

After 3703, the control unit 10 determines whether the average resource use rate of each job is calculated for each of all servers as the allocation target of the job of interest 13 (S704). When the determination at S704 is false (NO at S704), the control unit 10 performs S701 for any server for which average resource use rate of each job is not calculated.

When the determination at 3704 is true (YES at S704), the control unit 10 normalizes, for each allocation target server of the job of interest 13, the resource use rates of the three resource types (CPU, memory, and drive) so that the sum of three resource use rates corresponding to the resource types becomes equal to a predetermined value (for example, 100%) (S705).

Hereinafter, a job 13 having a job name "AAA" is referred to as a job "AAA", and a server 30 having a server name "BBB" is referred to as a server "BBB". For example, the job of interest 13 is a job "JobD", and the current allocation target servers 30 of the job "JobD" are servers "SV1" and "SV2". In this case, an exemplary result of S703 on each of the servers "SV1" and "SV2" is as illustrated in FIGS. 8 and 9. It can be understood from FIGS. 8 and 9 that the job "JobD" is executed at each of the server "SV1" belonging to the server type "general-purpose 1" and the server "SV2" belonging to the server type "general-purpose 2". In this case, an exemplary result of S705 is as illustrated in FIG. 10. Specifically, the resource use rates of the respective resource types before and after the normalization for each of the servers "SV1" and "SV2" are calculated for the job "JobD".

When there are two or more allocation target servers as in the case of the job "JobD", the server type of an allocation target server may be selected for the job "JobD" at each of the two or more allocation target servers based on a job characteristic determined later.

Figure 11:
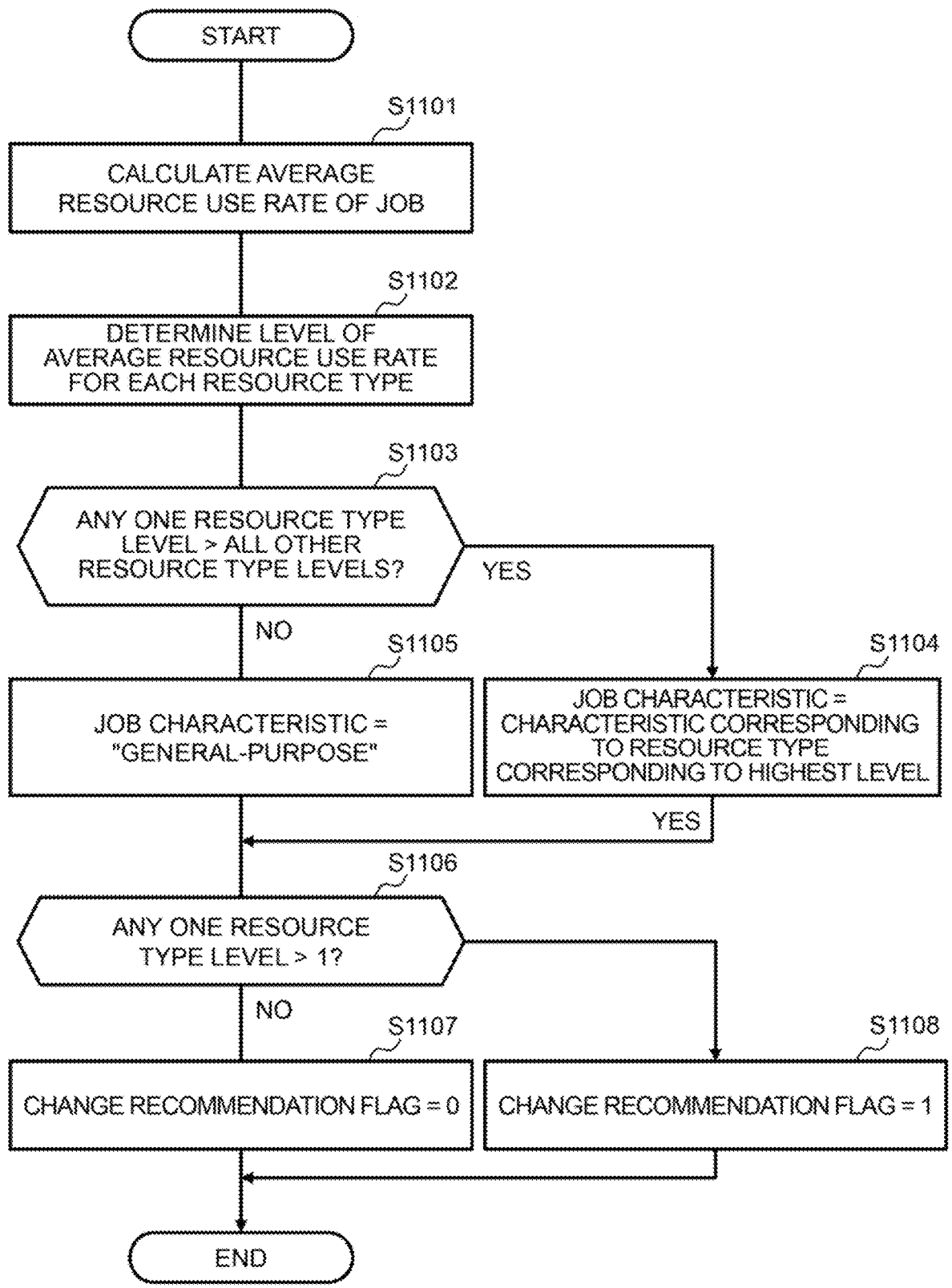
FIG. 11 illustrates an exemplary process of job characteristic determination processing (S606 in FIG. 6)

FIG. 11 illustrates an exemplary process of the job characteristic determination processing (S606 in FIG. 6).

The control unit 10 calculates, for the job of interest 13, the average resource use rate of each resource type over the resource use rates of all allocation target servers after the normalization (S1101). In the example illustrated in FIG. 10, the average resource use rate of the entire job "JobD" over the resource use rates of the servers "SV1" and "SV2" after the normalization is calculated for each resource type of the job of interest "JobD".

The control unit 10 determines a level of the calculated average resource use rate of each resource type of the job of interest "JobD" (S1102). For example, levels of each resource type are as listed below. The average resource use rate has a minimum value of 0% and a maximum value of 100%.

The level is determined to be "1" when the average resource use rate is lower than 33%.

The level is determined to be "2" when the average resource use rate is equal to higher than 33% and lower than 66%.

The level is determined to be "3" when the average resource use rate is equal to or higher than 66%.

The control unit 10 determines whether the determined level of any one resource type is higher than the determined level of all other resource types (S1103).

When the determination at S1103 is true (YES at S1103), the determined level of a resource type is highest and not equal to the level of any other resource type. In other words, the number of resource types having the highest average resource use rate is one. Thus, the control unit 10 specifies, as the job characteristic, a characteristic corresponding to the resource type of the highest level (S1104). For example, when the level of the resource type "CPU" is highest, "CPU-intensive type" is specified as the job characteristic.

When the determination at S1103 is false (NO at S1103), the levels of two or more resource types are highest. In other words, the number of resource types having the highest average resource use rate is not one. Thus, the control unit 10 specifies "general-purpose" as the job characteristic (31105).

After S1104 or S1105, the control unit 10 determines whether the determined level of any one resource type exceeds "1" (S1106).

When the determination at S1106 is false (NO at S1106), the job of interest 13 is regarded as a job, change of the allocation target of which has a relatively low effect. Thus, the control unit 10 sets "0" to the value of a change recommendation flag of the job of interest 13 (S1107). The "change recommendation flag" of each job indicates whether the allocation target of the job is recommended to be changed.

When the determination at S1106 is true (YES at S1106), the job of interest 13 is regarded as a job, change of the allocation target of which has a relatively high effect. Thus, the control unit 10 sets "1" to the value of the change recommendation flag of the job of interest 13 (S1108).

Figures 12, 13:
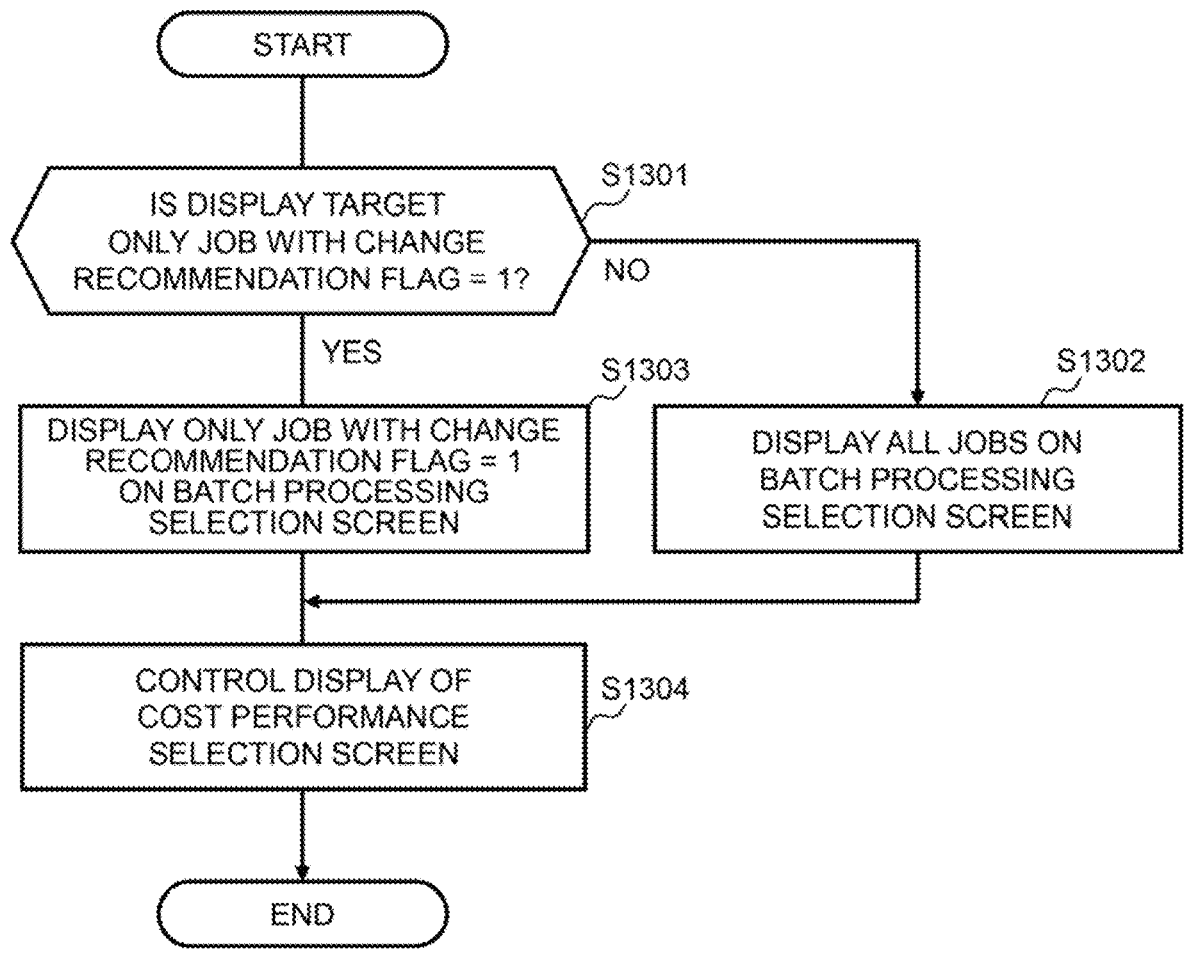
FIG. 12 illustrates an exemplary result of the job characteristic determination processing.
FIG. 13 illustrates an exemplary process of screen display processing (S609 in FIG. 6)

FIG. 12 illustrates exemplary results of the job characteristic determination processing performed for each job. In the example illustrated in FIG. 12, all jobs are jobs "JobA", "JobB", "JobC", and "JobD". For the job "JobD", the job characteristic is "CPU-intensive type", and the change recommendation flag is "1" because the determined level of at least one resource type exceeds "1". Information (information exemplarily illustrated in FIG. 12) that indicates the job name, determined job characteristic, and determined change recommendation flag of each job is stored in, for example, the storage apparatus 102. The job "JobD" is an exemplary job of interest 13 and is also an exemplary target job since the change recommendation flag thereof is "1".

According to FIG. 11, a condition that change of the allocation target server is recommended is, for example, that the resource use rate of at least one type of calculation resource exceeds a certain level. Accordingly, a job, at least a resource use rate of which is relatively large is allocated to a server having a server characteristic compatible with the determined job characteristic of the job (job characteristic compatible with the resource use rate of each resource type of the job). Thus, cost performance of batch processing achieved by the job is expected to improve. Change of the allocation target server is not performed for a job, the resource use rate of any resource type of which is relatively small. Thus, unnecessary job reallocation can be avoided.

FIG. 13 illustrates an exemplary process of the screen display processing (S609 in FIG. 6).

The control unit 10 determines whether a display target is only any job of the change recommendation flag=1 among a plurality of jobs (S1301).

Figure 14:
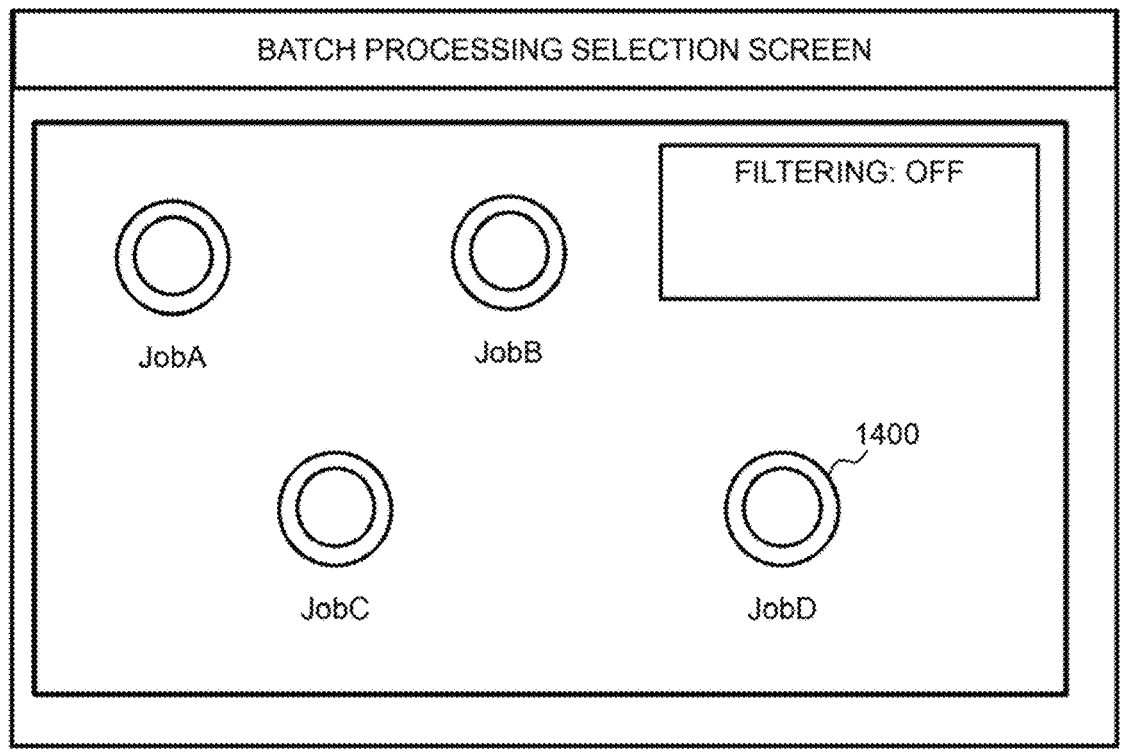
FIG. 14 illustrates an exemplary batch processing selection screen (filtering function: OFF) according to the first embodiment.

When the determination at S1301 is false (NO at S1301), the display target is all jobs. Thus, the control unit 10 displays a batch processing selection screen on which all jobs are displayed in a manner that user selection is possible (cost performance is changeable) (31302). FIG. 14 illustrates an exemplary batch processing selection screen displayed at S1302. In the example illustrated in FIG. 14, icons (exemplary display objects) of all jobs are displayed together with their job names. The batch processing selection screen is displayed on the user terminal 2.

Figure 15:
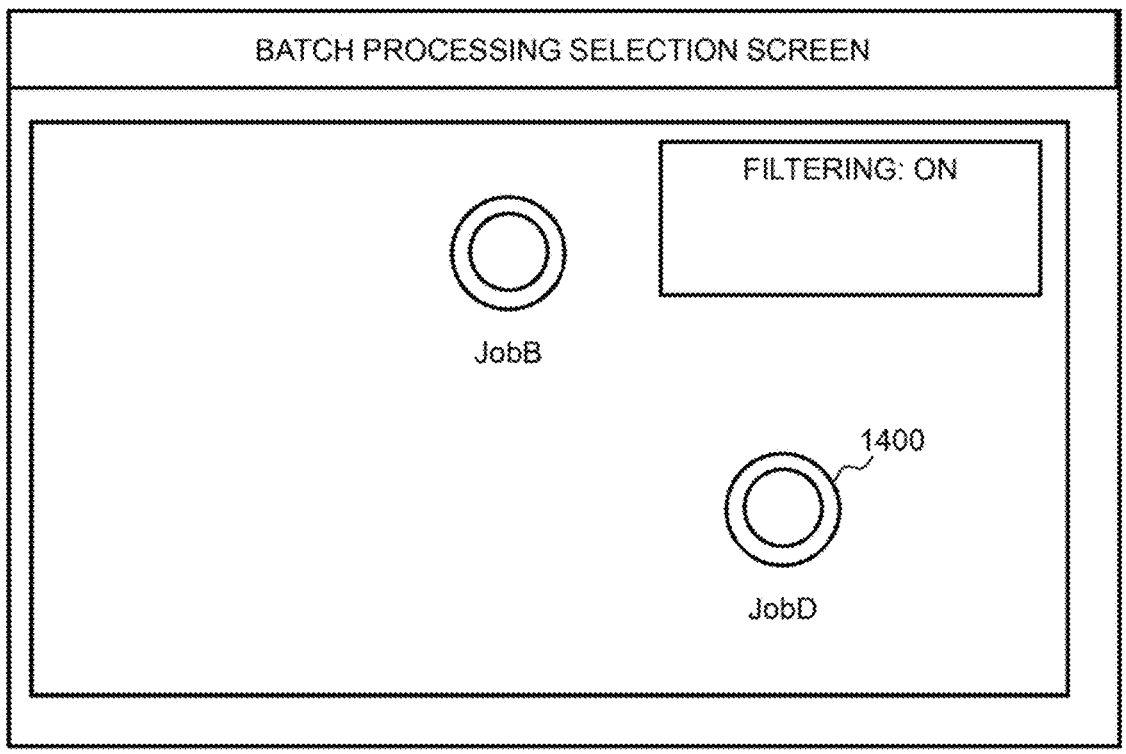
FIG. 15 illustrates an exemplary batch processing selection screen (filtering function: ON) according to the first embodiment.

When the determination at S1301 is true (YES at S1301), the display target is only any job of the change recommendation flag=1. Thus, the control unit 10 displays a batch processing selection screen on which only any job of the change recommendation flag=1 is displayed in a manner that user selection is possible (cost performance is changeable) (S1303). FIG. 15 illustrates an exemplary batch processing selection screen displayed at S1303. In the example illustrated in FIG. 15, the icons of the jobs "JobB" and "JobD" are displayed together with their job names. The screen exemplary illustrated in FIG. 15 is an exemplary selection UI. The "selection UI" is a user interface configured to receive selection of any of one or more jobs (in the present embodiment, any job of the change recommendation flag=1) obtained by narrowing down a plurality of jobs. Accordingly, a job having a high allocation target change effect can be easily selected by the user.

The "narrowing-down" of display target jobs may be, instead of display and non-display of jobs, display of only any job of the change recommendation flag=1 in a relatively enhanced manner among all jobs.

Whether the determination at S1301 is true or false may depend on a policy set in advance (for example, whether a filtering function is on (whether the display target is only any job of the change recommendation flag=1)) or may depend on whether an operation to switch the filtering function is performed on a temporarily displayed batch processing selection screen by the user.

Figures 18, 19:
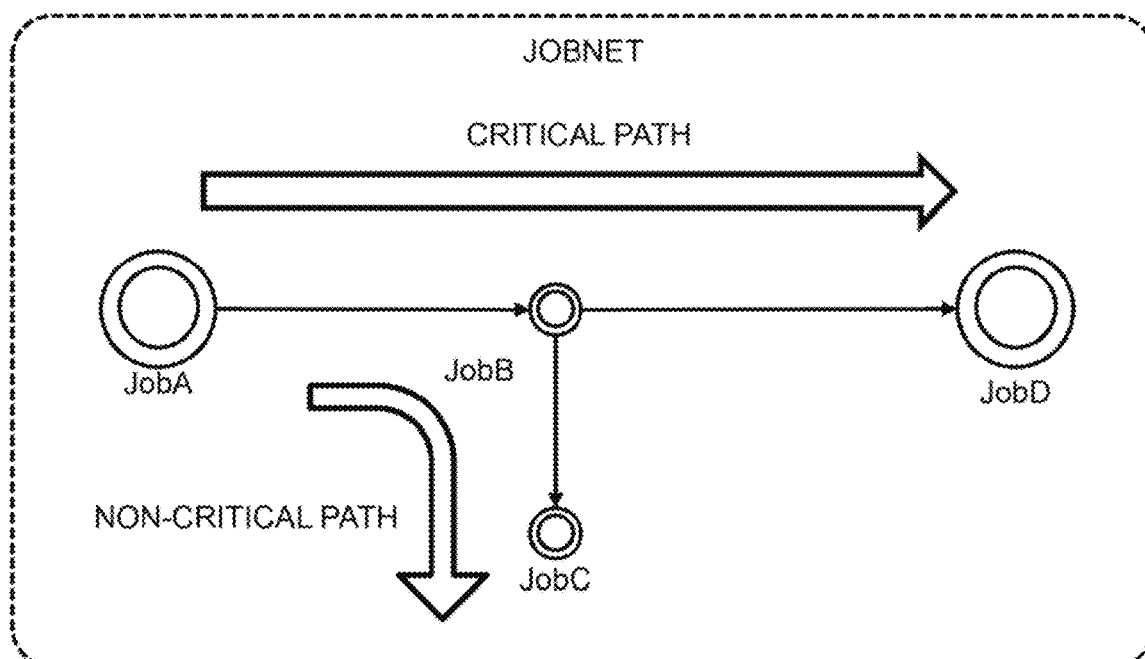
FIG. 18 illustrates the exemplary cost performance selection screen according to the first embodiment.
FIG. 19 illustrates an exemplary configuration of a jobnet in a second embodiment.

Assume that an operation to select the job "JobD" (exemplary job) (for example, an operation to click an icon 1400 of the job "JobD") is performed on the batch processing selection screen by the user. In response to this operation, the control unit 10 displays a cost performance selection screen (S1304). The cost performance selection screen is displayed on the user terminal 2. At S1304, the control unit 10 performs display control in response to a user operation on the cost performance selection screen. A cost performance selection screen exemplarily illustrated in FIGS. 16 to 18 is displayed by the display control.

The cost performance selection screen is an exemplary weight specification UI. The "weight specification UI" is a user interface configured to receive specification of use cost and performance weights related to execution of the selected job "JobD". The control unit 10 selects a server type compatible with a use cost and a resource amount that match weights specified through the cost performance selection screen, and selects a server belonging to the server type as the allocation target server of the job "JobD". In this manner, the control unit 10 receives specification of use cost and performance weights from the user, and selects a server type compatible with the weights. Thus, cost performance that satisfies needs of the user is expected to be maintained.

The control unit 10 predicts a use cost and an execution duration length that are related to execution of the job "JobD" when the allocation target server of the job "JobD" after change is assumed to be a server belonging to a server type compatible with a use cost and a resource amount that match weights provisionally specified through the cost performance selection screen (or a server belonging to the server type selected at S607 in FIG. 6). The control unit 10 displays the use cost and execution duration length of the current allocation target server (before change) (a use cost and an execution duration length that are specified based on the monitoring result table 200 and the server management table 400) and the use cost and the execution duration length that are predicted for the allocation target server after change. Accordingly, the user can compare the execution duration lengths and the use costs before and after allocation target change and check (approve) the execution duration length and the use cost after allocation target change, before permitting change of the allocation target of the job "JobD". Thus, it is unlikely that an execution duration length and a use cost that are expected after change of the allocation target server of the job "JobD" (the execution duration length and the use cost that are approved by the user) are exceeded.

The cost performance selection screen will be described below in detail.

Cost performance options are, for example, "cost-focused", "performance-focused", are "customization". When the job "JobD" is selected on the batch processing selection screen by the user, the cost performance selection screen is displayed in a state in which either option is selected.

In the present embodiment, when the job "JobD" is selected on the batch processing selection screen by the user, the control unit 10 displays the cost performance selection screen exemplarily illustrated in FIG. 16, in other words, the cost performance selection screen in a state in which "cost-focused" (for example, a radio button 1600 thereof) is selected. When "cost-focused" is selected, use cost and performance weights are unambiguously determined so that the use cost weight is larger than the performance weight and the difference between the use cost weight and the performance weight is equal to or larger than a certain value. In the example illustrated in FIG. 16, the use cost would decrease but the execution duration length would increase through the change of the allocation target of the job "JobD". The predicted execution duration length and use cost are based on a server type compatible with weights that match "cost-focused". Exemplary "provisional specification" of weights is selection of the radio button 1600 of "cost-focused" or a radio button 1700 of "performance-focused". Exemplary "specification" of weights is pressing of an "OK" button on the screen in a state in which the "provisional specification" is performed.

When "performance-focused" (for example, the radio button 1700 thereof) is selected on the cost performance selection screen exemplarily illustrated in FIG. 16, the control unit. 10 selects a server type compatible with weights that match "performance-focused", and predicts and displays a use cost and an execution duration length when the allocation target server of the job "JobD" after change is assumed to be a server belonging to the server type as exemplarily illustrated in FIG. 17. When "performance-focused" is selected, the use cost: and performance weights are unambiguously determined so that the performance weight is larger than the use cost weight and the difference between the performance weight and the use cost weight is equal to or larger than a certain value. In the example illustrated in FIG. 17, the performance weight is large and the use cost weight is small as compared to the example illustrated in FIG. 16, and thus the execution duration length is predicted to be is shorter and the use cost is predicted to be higher.

When "customization" (for example, a radio button 1800 thereof) is selected on the cost performance selection screen exemplarily illustrated in FIG. 16 or FIG. 17, the control unit 10 activates a slide bar 1850 (into a state in which the slide bar 1850 can be operated) as exemplarily illustrated in FIG. 18. When an option other than "customization" is selected, the control unit 10 deactivates the slide bar 1850 (into a state in which the slide bar 1850 cannot be operated).

The user can slide a knob 1851 when the slide bar 1850 is activated. Positioning of the knob 1851 to one end (for example, the left end) of the slide bar 1850 means specification of the highest degree of "cost-focused" (in other words, selection of "cost-focused"). Positioning of the knob 1851 to the other end (for example, the right end) of the slide bar 1850 means specification of the highest degree of "performance-focused" (in other words, selection of "performance-focused"). Adjustment of the position of the knob 1851 corresponds to adjustment of the use cost and performance weights and corresponds to exemplary "provisional specification" of weights. Each time the position of the knob 1851 is changed, the control unit 10 selects a server type compatible with weights corresponding to the position of the knob 1851 after the change, and predicts and displays a use cost and an execution duration length when the allocation target server of the job "JobD" after change is assumed to be a server belonging to the server type.

The determination at S610 in FIG. 6 is true for a case in which the cost performance change operation is performed on the cost performance selection screen exemplarily illustrated in FIGS. 16 to 18. The case in which "the cost performance change operation is performed" may be a case in which the "OK" button is pressed while either option (radio button) is selected.

The first embodiment is described above. In the first embodiment, S605 to S611 in FIG. 6 may be exemplary allocation optimization support processing.

Second Embodiment

A second embodiment will be described below. The description will be mainly made on difference from the first embodiment, and description of features common to those of the first embodiment will be omitted or simplified.

Although each job group 11 is one job 13 in the first embodiment, at least one job group 11 is a jobnet constituted by a plurality of jobs 13 in the second embodiment. FIG. 19 illustrates an exemplary jobnet. In FIG. 19, the size of an icon of each job means the length of the execution duration length thereof.

A jobnet has a directed acyclic graph (DAG) structure including nodes that are jobs and an edge that is an execution order of the jobs. Accordingly, the jobnet includes a plurality of paths. Each path corresponds to arrangement of two or more jobs in accordance with an execution order.

Execution of a jobnet is completed when execution of all jobs included in the jobnet is completed. In other words, execution of a jobnet is not completed when the jobnet includes at least one job, execution of which is yet to be completed.

Accordingly, a jobnet can include one critical path and one or more non-critical paths. Some jobs (one or more jobs) on the critical path can be included in one or more non-critical paths. The "critical path" is a path having a longest path execution duration length. The "path execution duration length" of each path is a duration length from start of execution of a job at the start of the path to completion of execution of a job at the end of the path, in other words, is the sum of two or more execution duration lengths corresponding to two or more paths, respectively, included in the path. Each "non-critical path" is a path that is not the critical path.

In the example illustrated in FIG. 19, the critical path is a path of the job "JobA"→the job "JobB"→the job "JobD", and a non-critical path is a path of the job "JobA"→the job "JobB"→the job "JobC". This is because the job "JobA" and the job "JobB" are common to the paths, and the execution duration length is longer for the job "JobD" among the jobs "JobC" and "JobD", which are different between the paths.

From the above description, the execution duration length of a jobnet is equal to the execution duration length of the critical path. The use cost of the entire jobnet may be the sum of a plurality of use costs corresponding to a plurality of jobs included in the jobnet. The use cost of at least one job may depend on allocation of all jobs of the user, such as allocation of two or more jobs including the job to an identical server.

Cost performance of the entire jobnet can be improved by a method of determining a job, the allocation target of which is to be changed, to be one or both of a job that satisfies a condition (x) below and a job that satisfies a condition (y) below.

(x) Included in a non-critical path but not included in the critical path.

(y) Included in the critical path.

The control unit 10 changes the allocation target of a job (for example, the job "JobC") that satisfies the condition (x) to a server of a server type having a use cost lower than that of a server type to which the current allocation target server of the job belongs, in a range in which the path execution duration length of each non-critical path is equal to or shorter than the path execution duration length of the critical path. Accordingly, cost performance of the jobnet can be improved, specifically, the use cost can be lowered in a range within the execution duration length of the jobnet.

Instead or in addition, the control unit 10 changes the allocation target of a job (for example, the job "JobA", "JobB", or "JobD") that satisfies the condition (y) to a server of a server type in accordance with the use cost and performance weights. Accordingly, cost performance of the jobnet can be improved.

In the present embodiment, the table group 64 includes a jobnet configuration table illustrated in FIG. 20 and a jobnet execution duration length table illustrated in FIG. 21.

FIG. 20 illustrates an exemplary configuration of the jobnet configuration table.

This jobnet configuration table 2000 lists the configuration of each jobnet. For example, the jobnet configuration table 2000 stores, for each jobnet, information such as a jobnet name 2001, a job name 2002, and a subsequent job name 2003. The following description will be made on an example with one jobnet ("jobnet of interest" in description of FIG. 20).

The jobnet name 2001 indicates the jobnet name of the jobnet of interest. The job name 2002 indicates the job name of each of two or more jobs included in the jobnet of interest. For each of the two or more jobs included in the jobnet of interest, the subsequent job name 2003 indicates the job name of a subsequent job (subsequently executed job) of the job. One or a plurality of subsequent jobs may exist for one job. No subsequent job exists for a job corresponding to a leaf node in a DAG structure (the subsequent job name 2003 is "-").

FIG. 21 illustrates an exemplary configuration of the jobnet execution duration length table.

This jobnet execution duration length table 2100 lists the path execution duration length of each path in each jobnet. For example, the jobnet execution duration length table 2100 stores, for each path, information such as a jobnet name 2101, a path #(path number) 2102, a job order 2103, and a path execution duration length 2104. The following description will be made on an example with one path ("path of interest" in description of FIG. 21).

The jobnet name 2101 indicates the jobnet name of a jobnet including the path of interest. The path #2102 indicates the number of the path of interest. The job order 2103 indicates the execution order of two or more jobs included in the path of interest. (the execution order of jobs is expressed by, for example, the stated order of their job names). The path execution duration length 2104 indicates the path execution duration length of the path of interest.

Exemplary processing performed in the present embodiment will be described below. In the present embodiment, processing achieved by jobnet execution is batch processing. Thus, for each job included in a jobnet, processing achieved by execution of the job is partial processing of batch processing.

Figure 22:
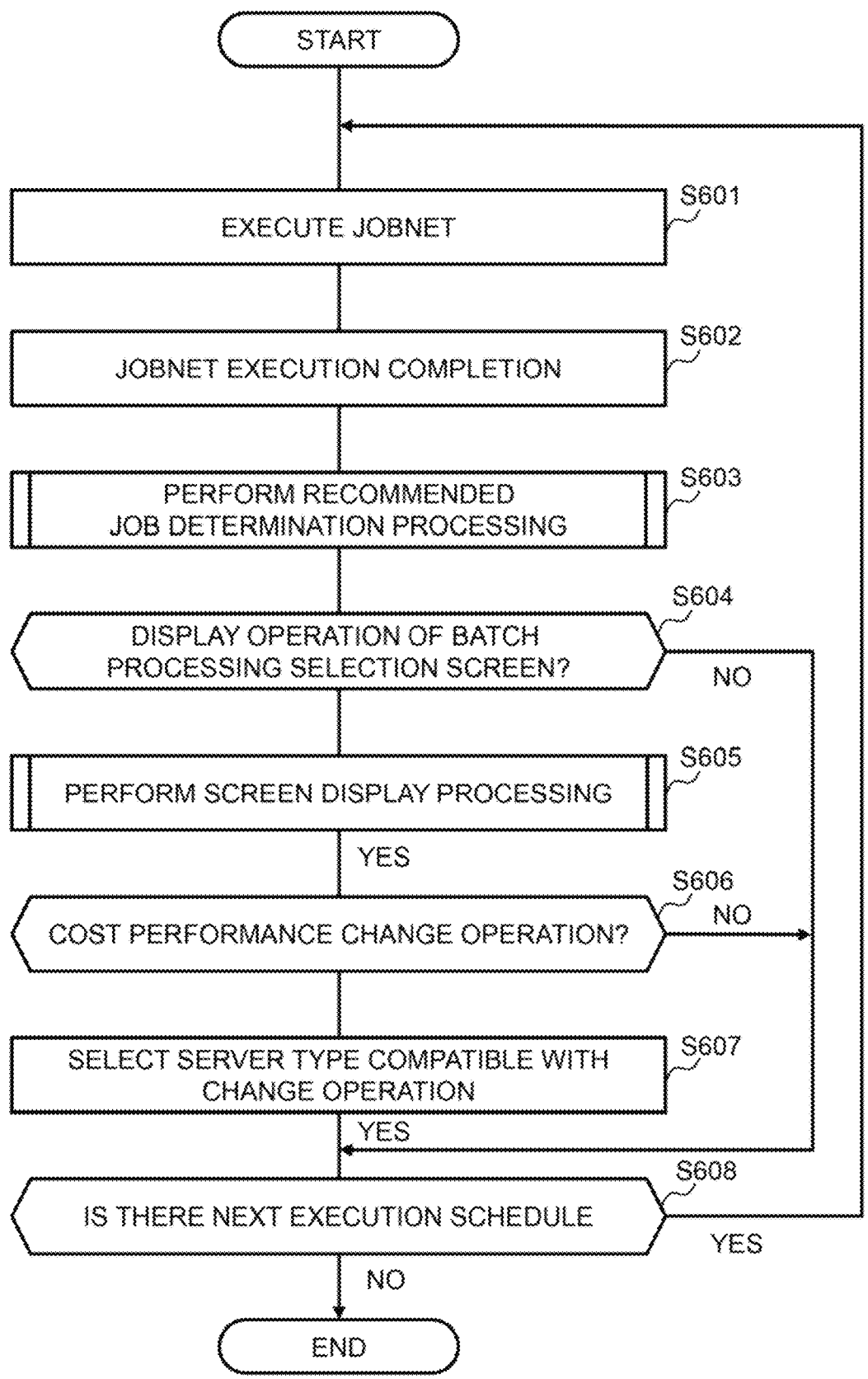
FIG. 22 illustrates an exemplary entire process of processing including jobnet execution.

FIG. 22 illustrates an exemplary entire process of processing including jobnet execution. The following description will be made on an example with one jobnet ("jobnet of interest" in description of FIGS. 22 to 30).

The jobnet of interest is executed at one or more allocation target servers to which the jobnet of interest is allocated (S2201). Execution of the jobnet of interest is completed (S2202).

The control unit 10 performs recommended job determination processing (S2203). Details of the recommended job determination processing will be described later with reference to FIG. 23.

Although not illustrated, the control unit 10 may specify, based on the job characteristic table 300, a server characteristic compatible with the job characteristic of a recommended job (job, the allocation target of which is recommended to be changed) determined at S2203 and select a server type belonging to the specified server characteristic based on the server management table 400 and various resource use rates of the recommended job (exemplary target job). Such specification of a server characteristic and a server type may be same as in the first embodiment.

The control unit 10 determines whether a display operation of a batch processing selection screen is received from the user terminal 2 (S2204). When the determination at S2204 is false (NO at S2204), the process proceeds to S2208. In the case of NO at S2204, the control unit 10 may change the allocation target of the recommended job in the jobnet of interest to a server belonging to the above-described selected server type.

When the determination at S2204 is true (YES at S2204), the control unit 10 performs screen display processing (S2205). Details of the screen display processing will be described later with reference to FIG. 25.

After S2205, the control unit 10 determines whether a cost performance change operation is received from the user terminal 2 (S2206). When the determination at S2206 is false (NO at S2206), the process proceeds to S2208.

When the determination at S2206 is true (YES at S2206), the control unit 10 selects a server type compatible with the contents of the cost performance change operation (S2207). For example, when the contents of the cost performance change operation include an operation to change performance-focused to cost-focused, the control unit 10 refers to the server management table 400 and selects a server type having specifications lower than those (having a use cost lower than that) of a server type already selected for the recommended job from among a plurality of server types belonging to the server characteristic selected for the recommended job. Thereafter, the process proceeds to S2208. Between S2206 and S2207, the control unit 10 may change the allocation target of the recommended job to a server 30 belonging to the server type selected at 32207.

At S2208, the control unit 10 determines whether the jobnet of interest (batch processing) has a next execution schedule. When the determination at S2208 is true (YES at S2208), the process returns to S2201 for the jobnet of interest. Accordingly, at the next execution, the jobnet of interest including the recommended job is executed at the allocation target server 30 after change, and the processing at S2202 and later is performed.

In description of FIG. 22, in the case of NO at S2204 or in the case of NO at S2206, an execution duration length and a use cost that are predicted when the allocation target is a server belonging to a server type selected for the recommended job before S2207 are not checked by the user, and the selected server type is determined as a server type corresponding to the recommended job. The allocation target server 30 of the recommended job is a server 30 belonging to the determined server type.

The processing exemplarily illustrated in FIG. 22 may be separated into a plurality of pieces of processing. For example, the processing at S2201 and S2202 may be performed for each jobnet. The processing at S2203 to S2208 may be periodically or non-periodically performed for all jobnets.

Figure 23:
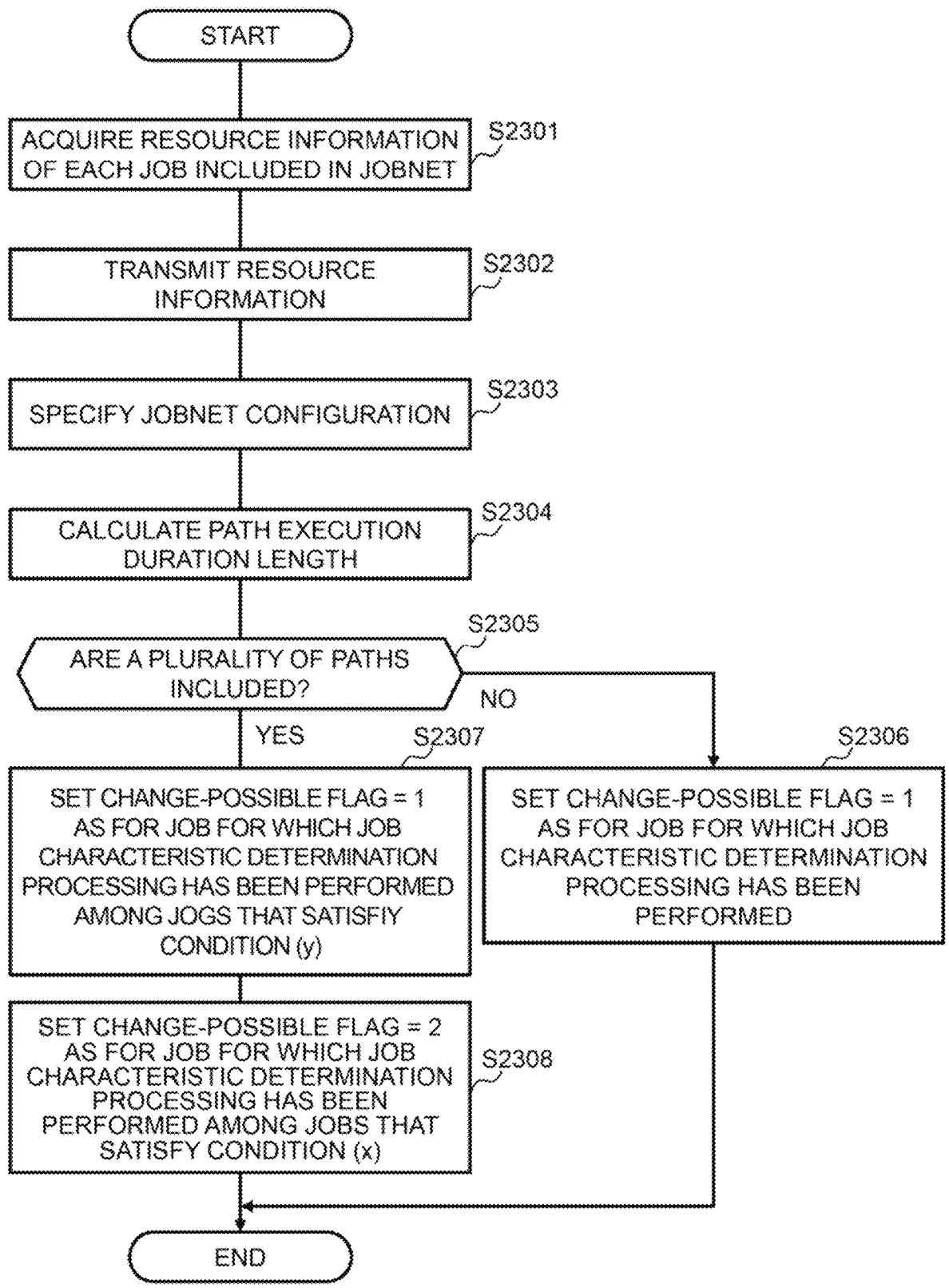
FIG. 23 illustrates an exemplary process of recommended job determination processing (S2203 in FIG.

FIG. 23 illustrates an exemplary process of the recommended job determination processing (S2203 in FIG. 22).

For each of one or more allocation target servers of a plurality of jobs included in the jobnet of interest, resource information of each job in the jobnet of interest is acquired from the resource information acquisition unit 32 of a public cloud 3 that provides the server (S2301). The resource information acquisition unit 32 transmits the acquired resource information to the job allocation support system 1 (S2302). The monitoring unit 41 of the job allocation support system 1 receives the resource information of each job in the jobnet of interest and registers the resource information to a column corresponding to the server name in the resource information in the monitoring result table 200. Accordingly, the resource use rates of various calculation resources per unit duration for the execution time slot of the jobnet of interest are registered to the monitoring result table 200 for each job included in the Jobnet of interest.

Although not illustrated, the control unit 10 may perform resource use rate normalization processing for each job in the jobnet of interest. Details of the normalization processing may be same as in the first embodiment.

Although not illustrated, the control unit 10 may perform job characteristic determination processing for each job in the jobnet of interest. Details of the job characteristic determination processing may be same as in the first embodiment.

The control unit 10 specifies the configuration of the jobnet of interest based on the jobnet configuration table 2000 (S2303). As a result, one or more paths included in the jobnet of interest are specified.

The control unit 10 calculates the path execution duration length of each of the one or more paths included in the jobnet of interest based on the monitoring result table 200 (S2304). The control unit 10 registers information (for example, the job order and the path execution duration length) of each of the one or more paths included in the jobnet of interest to the jobnet execution duration length table 2100.

The control unit 10 determines whether the jobnet of interest includes a plurality of paths (32305).

When the determination at S2305 is false (NO at S2305), the control unit 10 sets a change-possible flag 1 as for a job for which the job characteristic determination processing (processing in FIG. 11) is already performed among two or more jobs included in one path (S2306). The "change-possible flag" is a flag for each job in the jobnet and indicates whether it is possible to change the allocation target of the job. The control unit 10 sets the change-possible flag=0 to a job for which the job characteristic determination processing is yet to be performed (a job for which the job characteristic is not determined).

When the determination at S2305 is false (NO at S2305), the control unit 10 sets the change-possible flag=1 as for a job for which the job characteristic determination processing (processing in FIG. 11) is already performed among jobs that satisfy the above-described condition (y) (in other words, jobs included in the critical path) (S2307). The control unit 10 also sets the change-possible flag=2 as for a job for which the job characteristic determination processing (processing in FIG. 11) is already performed among jobs that satisfy the above-described condition (x) (in other words, jobs included in a non-critical path but not included in the critical path) (S2308). The control unit 10 sets the change-possible flag=0 to a job for which the job characteristic determination processing is yet to be performed (a job for which the job characteristic is yet to be determined).

Figures 24, 25:
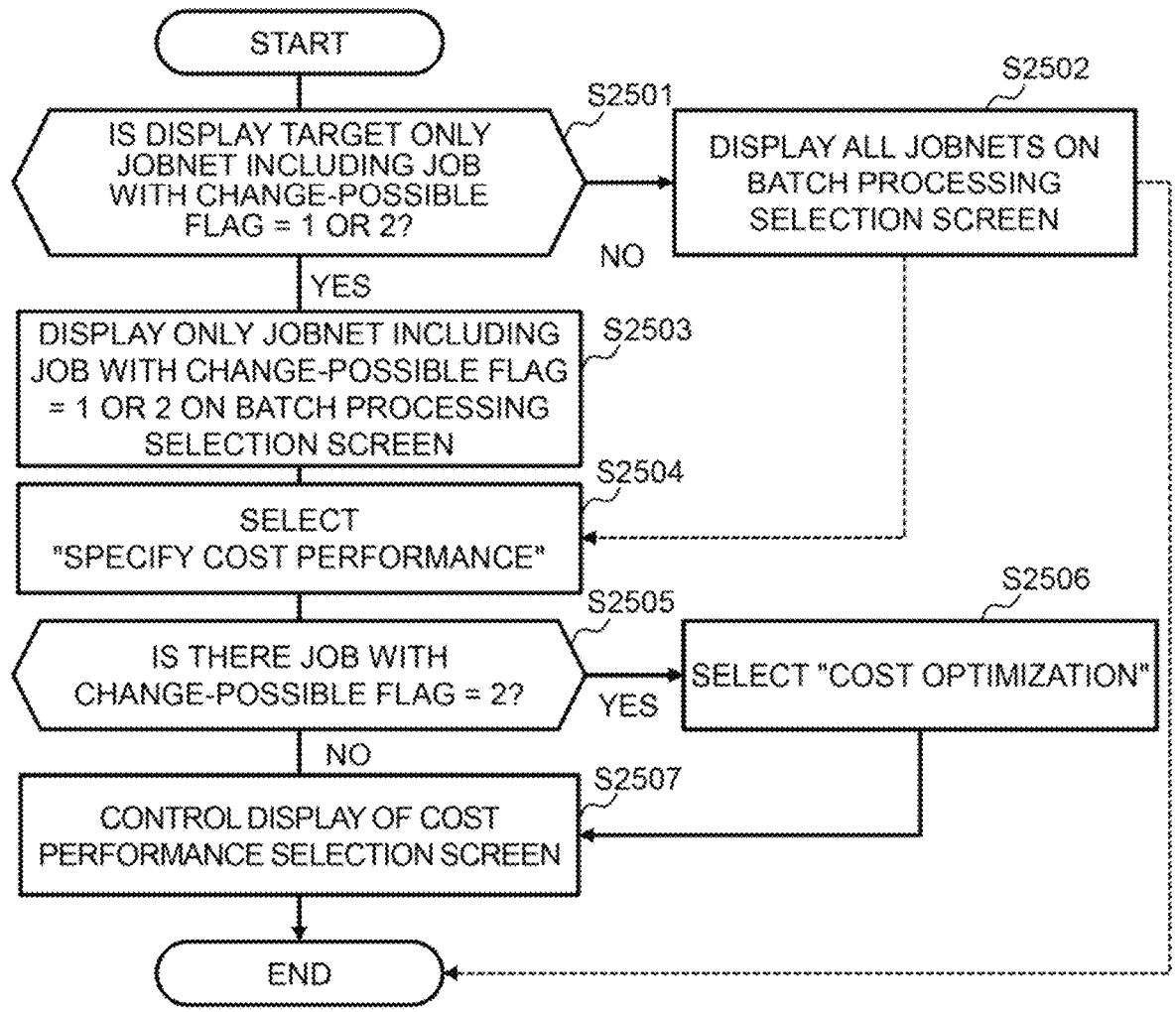
FIG. 24 illustrates an exemplary result of the recommended job determination processing.
FIG. 25 illustrates an exemplary process of screen display processing (S2205 in FIG. 22)

FIG. 24 illustrates exemplary results of the recommended job determination processing performed for the jobnet of interest (hereinafter, a path of a path #"n" is referred to as a "path n"). In the example illustrated in FIG. 24, the jobnet of interest is a jobnet "Jobnet1" (jobnet having the jobnet name "Jobnet1"). In the example illustrated in FIGS. 20 and 21, the jobnet "Jobnet1" includes the jobs "JobA", "JobB", "JobC", and "JobD", and the change-possible flag is "2" for the job "JobC" and "1" for the other jobs "JobA", "JobB", and "JobD". This is because only the job "JobC" is a job that satisfies the condition (x) (a job included in a non-critical path but not included in the critical path) and the other jobs "JobA", "JobB", and "JobD" are each a job that satisfies the condition (y) (a job included in the critical path). In the example illustrated in FIGS. 20 and 21, the jobnet "Jobnet1" includes a path 1 and a path 2, the path 1 is a non-critical path and the path 2 is the critical path. This is because the path execution duration length of the path 2 is longer than that of the path 1.

FIG. 25 illustrates an exemplary process of the screen display processing (S2205 in FIG. 22).

The control unit 10 determines whether there is a jobnet including a job of the change-possible flag=1 or 2 (S2501).

Figure 26:
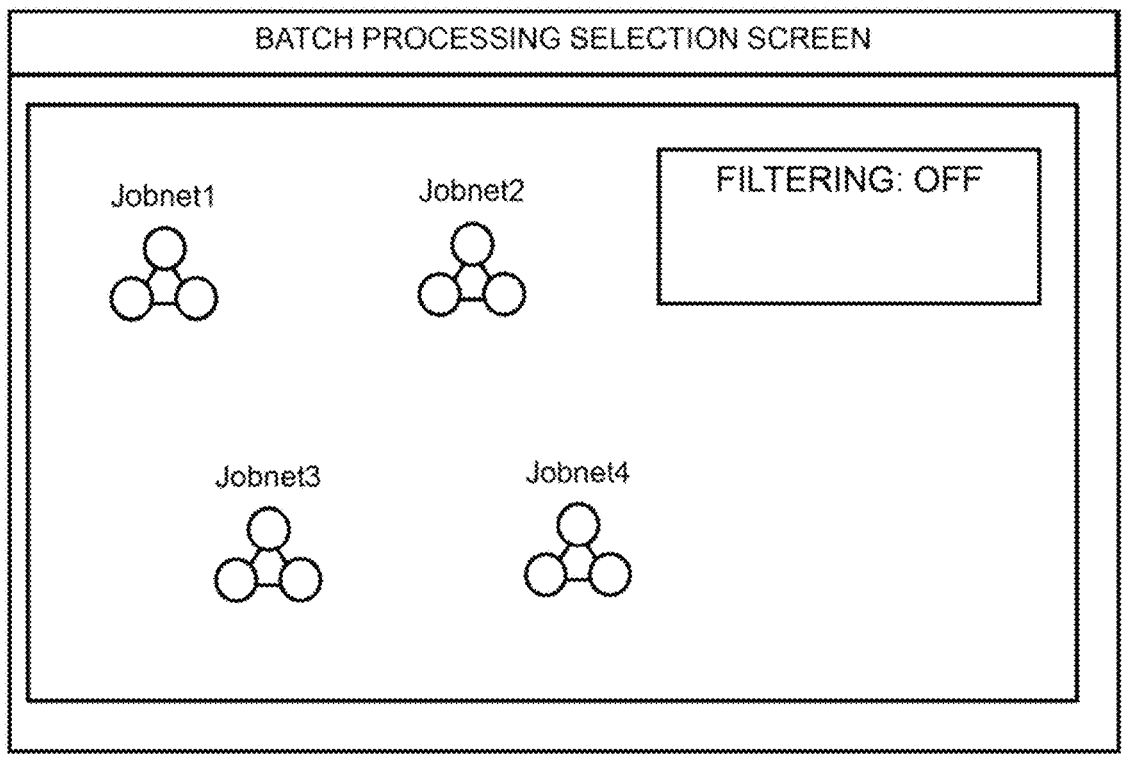
FIG. 26 illustrates an exemplary batch processing selection screen (filtering function: OFF) according to the second embodiment.

When the determination at S2501 is false (NO at S2501), the display target is all jobnets. Thus, the control unit 10 displays a batch processing selection screen on which all jobnets are displayed in a manner that user selection is possible (cost performance is changeable) (S2502). FIG. 26 illustrates an exemplary batch processing selection screen displayed at S2502. In the example illustrated in FIG. 26, icons (exemplary display objects) of all jobnets are displayed together with their jobnet names. When the icon of a jobnet including a job of the change-possible flag=1 or 2 is selected on the screen, the process proceeds to S2504. When the icon of a jobnet including only any job of the change-possible flag=0 is selected on the screen, there is no job, the allocation target of which can be changed (there is no job, for which the job characteristic is determined), and thus the screen display processing ends.

Figure 27:
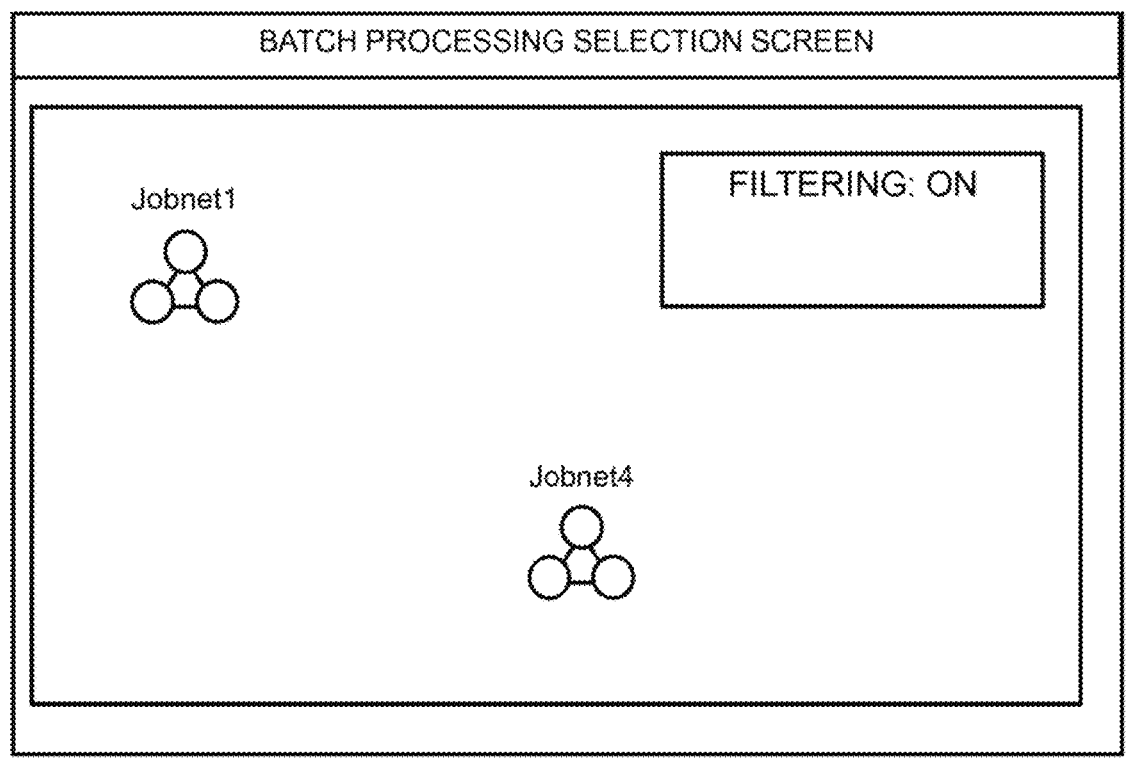
FIG. 27 illustrates the exemplary batch processing selection screen (filtering function: ON) according to the first embodiment.

When the determination at S2501 is true (YES at S2501), the display target is only any jobnet including a job of the change-possible flag=1 or 2. Thus, the control unit 10 displays a batch processing selection screen on which only any jobnet including a job of the change-possible flag=1 or 2 is displayed in a manner that user selection is possible (cost performance is changeable) (S2503). FIG. 27 illustrates an exemplary batch processing selection screen displayed at S2503. In the example illustrated in FIG. 27, the icons of the jobnets "Jobnet1" and "Jobnet4" are displayed together with their jobnet names.

The "narrowing-down" of display target jobnets may be, instead of display and non-display of jobnets, display of only any jobnet including a job of the change-possible flag=1 or 2 among all jobnets in a relatively enhanced manner.

Whether the determination at S2501 is true or false may depend on a policy set in advance (for example, whether a filtering function is on (whether the display target is only any jobnet including a job of the change-possible flag=1 or 2)) or may depend on whether an operation to switch the filtering function is performed on a temporarily displayed batch processing selection screen by the user.

Assume that the jobnet "Jobnet1" is selected as a jobnet including a job of the change-possible flag=1 or 2 on the batch processing selection screen exemplarily illustrated in FIG. 26 or FIG. 27. In this case, since the jobnet "Jobnet1" includes at least a job of the change-possible flag=1, the control unit 10 selects "cost performance specification" to be described later (S2504). When the jobnet "Jobnet1" also includes a job of the change-possible flag=2 (YES at S2505), the control unit 10 also selects "cost optimization" to be described later (S2506).

Figure 30:
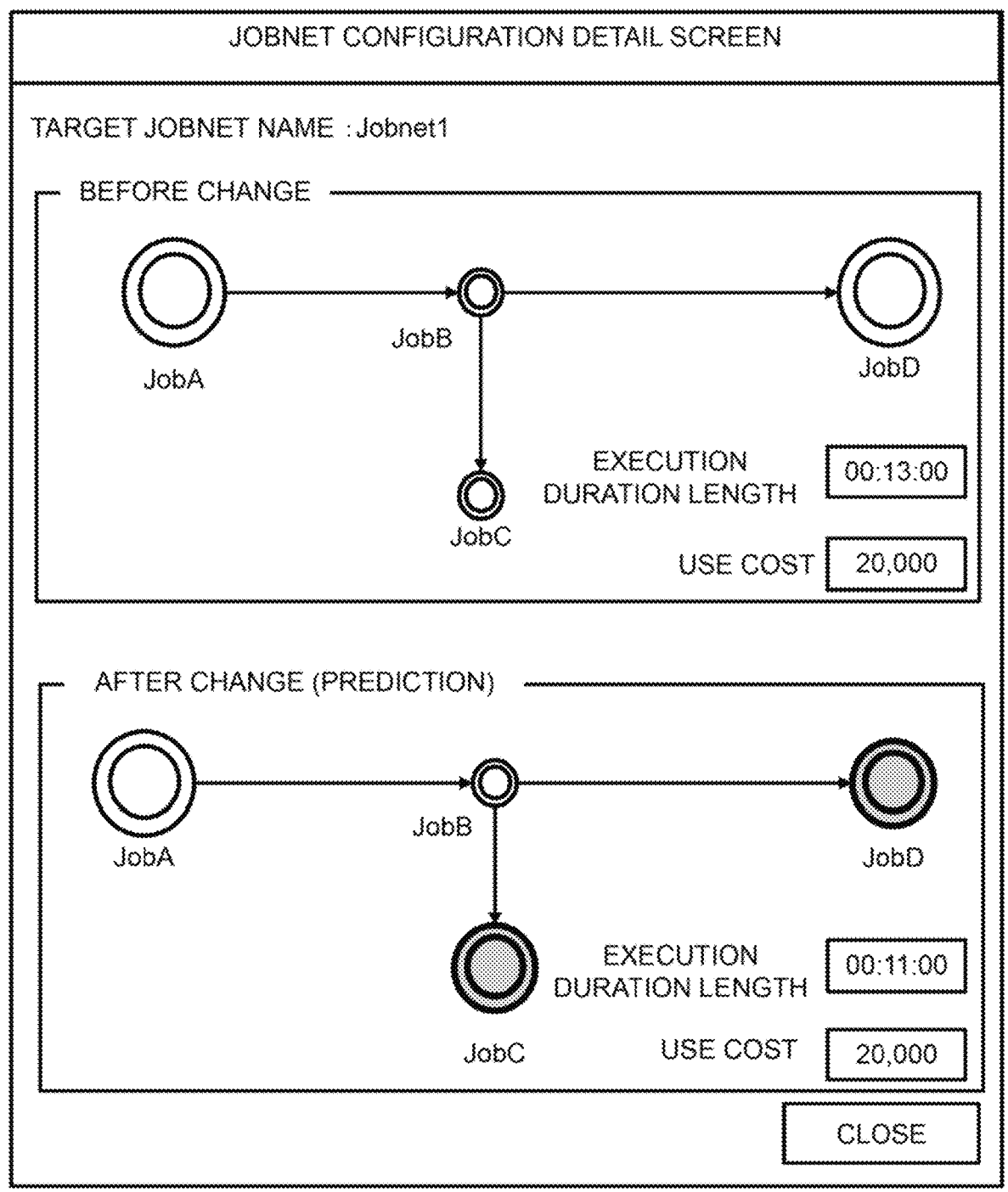
FIG. 30 illustrates an exemplary cost performance selection screen according to the second embodiment.

When at least the "cost performance specification" is selected, the control unit 10 displays a cost performance selection screen (S2507). At S2507, the control unit 10 performs display control in response to a user operation on the cost performance selection screen. A cost performance selection screen exemplarily illustrated in FIGS. 28 to 30 is displayed by the display control.

FIG. 28 illustrates an exemplary cost performance selection screen when the jobnet "Jobnet1" includes a job of the change-possible flag=1 but does not include a job of the change-possible flag=2 (in other words, a screen in a case of NO at S2505 in FIG. 25). In the example illustrated in FIG. 28, the "cost performance specification" is selected, and thus a slide bar 2850 is activated. The user can adjust (specify) cost and performance weights for the job of the change-possible flag=1 by adjusting the position of a knob 2851 of the slide bar 2850. Thus, the "cost performance specification" is specification of weights (cost and performance weights) for the job of the change-possible flag=1 (exemplary recommended job (job, the allocation target of which is recommended to be changed)), the weights being referred to in selection of a server type after the change. The "job of the change-possible flag=1" may be a job selected by the user or may be a job selected by the control unit 10 based on at least one of the execution duration length of the job, the relation among the resource use rates, resource types, and job characteristic of the job, and whether the job is included in a non-critical path. For example, the "job of the change-possible flag=1" may be a job having a longest execution duration length, a job having a highest resource use rate of a resource type corresponding to the job characteristic thereof, or a job not included in a non-critical path.

An execution duration length and a use cost displayed on the cost performance selection screen are the path execution duration length and use cost of the jobnet "Jobnet1". In the example illustrated in FIG. 28, since the knob 2851 is on the performance-focused side, it is predicted that the path execution duration length decreases but the use cost increases when the allocation target of the job of the change-possible flag=1 is changed.

FIG. 29 illustrates an exemplary cost performance selection screen when the jobnet "Jobnet1" also includes a job of the change-possible flag=2 (in other words, a screen in a case of YES at S2505 in FIG. 25). In the example illustrated in FIG. 29, the "cost optimization" is selected. In this case, based on the server management table 400, the control unit 10 selects, as a server type corresponding to the allocation target of the job of the change-possible flag=2 (another exemplary recommended job) after change, a server type having a lowest use cost in a range within the execution duration length of the jobnet "Jobnet1" (in other words, the path execution duration length of the critical path). In the example illustrated in FIG. 29, a predicted execution duration length does not change but a predicted use cost is low as compared to the example illustrated in FIG. 28.

FIG. 30 illustrates an exemplary cost performance selection screen when an operation (for example, pressing of a "change detail" button) to display details before and after allocation target change is performed on the screen exemplarily illustrated in FIG. 29. Each gray icon among icons of a plurality of jobs on the screen exemplarily illustrated in FIG. 30 is the icon of a job, the allocation target of which is to be changed. The size of the icon of each job indicates the length of the execution duration length of the job. In place of or in addition to the icon size, another type of display manner may be employed as a display manner of indicating the execution duration length of each job. It can be understood from the example illustrated in FIG. 30 that, for example:

The difference between the sizes of the icons of the jobs "JobC" and "JobD" indicates that a path including the job "JobD" is the critical path, and a path including the job "JobC" is a non-critical path.

In the critical path, the job "Job)" is a job of the change-possible flag=1 and is a job, the allocation target of which is to be changed. Since the size of the icon of the job "JobD" decreases through the change, it is predicted that the execution duration length of the job "JobD" decreases, and as a result, the path execution duration length of the critical path (the execution duration length of the jobnet "Jobnet1") decreases from "00:13:00" to "00:11:00". However, it is predicted that the use cost of the job "JobD" increases by an amount corresponding to the decrease of the execution duration length of the job "JobD".

In the non-critical path, the job "JobC" is a job of the change-possible flag=2 and is a job, the allocation target of which is to be changed. Since the size of the icon of the job "JobC" increases through the change, it is predicted that the execution duration length of the job "JobC" increases but the path execution duration length of the non-critical path does not increase beyond the path execution duration length "00:11:00" of the critical path. In addition, since it is predicted that the use cost of the job "JobD" increases but the predicted use cost of the jobnet "Jobnet1" does not change from "20.000", it is predicted that the use cost of the job "JobC" decreases by an amount corresponding to the increase of the execution duration length of the job "JobC". Accordingly, improvement effects of the jobs "JobD" and "JobC" are combined, and as a result, it is predicted that the execution duration length of the jobnet "Jobnet1" can be reduced without changing the use cost.

The second embodiment is described above. In the second embodiment, processing including part (S2303 to S2308 in FIG. 23) of S2203 in FIG. 22 and S2204 to S2207 may be exemplary allocation optimization support processing.

The screen exemplarily illustrated in FIG. 30 displays a DAG structure (of a target jobnet) before and after change of the allocation target of a target job (recommended job, the allocation target of which is to be changed) in the jobnet "Jobnet1" (exemplary target jobnet). The display manner of each node in each displayed DAG structure depends on the execution duration length of a job corresponding to the node and whether the job corresponding to the node is a target job. In addition, the execution duration length and use cost of the jobnet "Jobnet1" before and after change of the allocation target of the target job are displayed. From the screen, the user can understand which job is a job, the allocation target of which is to be changed in the target jobnet and how the execution duration length and use cost of the jobnet "Jobnet1" change through the allocation target change.

In the present embodiment, the control unit 10 selects, as a server type corresponding to the allocation target of a job that satisfies the condition (x) after change, a server type having a lowest use cost in a range in which the execution duration length of a non-critical path including the job is equal to or shorter than the execution duration length of the critical path. Accordingly, the use cost is optimized.

In the present embodiment, when a job that satisfies the condition (x) (a job included in a non-critical path but not included in the critical path) and a job that satisfies the condition (y) (a job included in the critical path) are target jobs, the control unit 10 selects the server type of the target job that satisfies the condition (y) after change based on use cost and performance weights, and thereafter, selects the server type of the target job that satisfies the condition (x) after change. In other words, first, the path execution duration length of the critical path is changed in accordance with weights (cost and performance weights) specified by the user, and subsequently, the use cost is optimized in a range within the path execution duration length of the critical path after change. Accordingly, cost performance is optimized.

Some embodiments described above are exemplary for description of the present invention, and the scope of the present invention is not limited to these embodiments. The present invention may be executed in various other forms.

For example, the job characteristic determination processing or other processing may be processing using a learning-completed neural network in place of the above-described processing.

For example, a server type corresponding to the allocation target server of a job may be selected in a range within a use cost upper limit of the job or a jobnet including the job. The use cost upper limit may be specified for each job or each jobnet by the user. The use cost upper limit of each job or each jobnet may be calculated by the control unit 10 based on a total use cost upper limit specified by the user and the number of jobs or jobnets.

For example, at least one server 30 may exist at a place other than a public cloud 3.

For example, the use cost of each server type (or each server) may depend on a public cloud 3 to which the server type belongs. For example, the unit duration of the public cloud 3 may be longer or shorter than one hour (for example, one minute). A server type corresponding to the allocation target of a job may be selected based on the execution duration length of the job.

What is claimed is:

1. A job allocation support system comprising:
an interface apparatus coupled with a plurality of servers;
a storage apparatus;
and a processor coupled with the interface apparatus and the storage apparatus, wherein the processor monitors one or a plurality of jobs allocated to one or more of the plurality of servers, stores, in the storage apparatus, monitoring result information that indicates a result of the monitoring of the one or plurality of jobs, and periodically or non-periodically performs, based on the monitoring result information, allocation optimization support processing that supports optimization of job allocation, each of the one or plurality of jobs uses, for execution of the job, one or more kinds of calculation resources included in an allocation target server of the job, the monitoring result information includes, for each of the one or plurality of jobs, information that indicates a resource use rate of each of the one or more kinds of calculation resources included in the allocation target server of the job and used for execution of the job per duration,
and the allocation optimization support processing includes
determining, for each of the one or plurality of jobs based on the monitoring result information, a job characteristic compatible with the resource use rate of each of the one or more kinds of calculation resources used by the job in the allocation target server of the job, and
selecting, when there is a target job that matches a condition that the allocation target server of the target job is recommended to be changed, an allocation target server of the target job after the change from among one or more servers each having a server characteristic compatible with the determined job characteristic of the target job based on at least one of an execution duration length and resource use rates of various calculation resources, which are specified for the target job based on the monitoring result information, a use cost of each of the one or more servers, and resource amounts of various calculation resources in each of the one or more servers.

2. The job allocation support system according to claim 1, wherein
the allocation optimization support processing includes providing a weight specification user interface (UI) configured to receive specification of use cost and performance weights related to execution of a target job group including the target job,
the job group includes one or more jobs, and
the selected allocation target server after the change is a server corresponding to a use cost and resource amounts compatible with the weights specified through the weight specification UI.

3. The job allocation support system according to claim 2, wherein the allocation optimization support processing includes
predicting a use cost and an execution duration length that are related to execution of the target job group when a server corresponding to a use cost and resource amounts compatible with weights provisionally specified through the weight specification UI is assumed as the allocation target server of the target job after the change, and
displaying a use cost and an execution duration length for the allocation target server before the change, and the use cost and the execution duration length that are predicted for the allocation target server after the change.

4. The job allocation support system according to claim 3, wherein
the target job group is a target jobnet constituted by a plurality of jobs including the target job,
the jobnet has a directed acyclic graph (DAG) structure including nodes that are jobs and an edge that is an execution order of the jobs,
the allocation optimization support processing includes
displaying the DAG structure of the target jobnet before and after allocation target change of the target job, and
displaying an execution duration length and a use cost of the target jobnet before and after allocation target change of the target job, and
a display manner of each node in each displayed DAG structure depends on an execution duration length of a job corresponding to the node and whether the job corresponding to the node is the target job.

5. The job allocation support system according to claim 2, wherein
the allocation optimization support processing includes providing a selection user interface (UI) configured to receive selection of any of one or more target job groups narrowed down from a plurality of job groups, and
the weights specified through the weight specification UI are weights of the target jobs selected through the selection UI.

6. The job allocation support system according to claim 1, wherein the condition is that the resource use rate of at least one kind of a calculation resource exceeds a certain level.

7. The job allocation support system according to claim 1, wherein
a target job is included in either jobnet constituted by a plurality of jobs,
the jobnet has a directed acyclic graph (DAG) structure including nodes that are jobs and an edge that is an execution order of the jobs,
a target jobnet including the target job includes a plurality of paths each constituted by two or more sequential jobs and is completed when all paths are completed,
the condition is (x) or (y) below:
(x) a job is included in a non-critical path other than a critical path and not included in the critical path; or
(y) a job is included in the critical path, and
the critical path of the target jobnet has a longest execution duration length.

8. The job allocation support system according to claim 7, wherein in the allocation optimization support processing, the allocation target server of the target job that satisfies (x) after the change has a lowest use cost in a range in which an execution duration length of a non-critical path including the target job is equal to or shorter than the execution duration length of the critical path.

9. The job allocation support system according to claim 8, wherein in the allocation optimization support processing, selecting the allocation target server after the change includes selecting the allocation target server of the target job that satisfies (y) after the change based on use cost and performance weights, and then selecting the allocation target server of the target job that satisfies (x) after the change.

10. A job allocation support method comprising (A) and (B) below:

(A) monitoring, by a computer, one or a plurality of jobs allocated to one or more of a plurality of servers;

and (B) periodically or non-periodically performing, by the computer based on monitoring result information that indicates a result of the monitoring of the one or plurality of jobs, allocation optimization support processing that supports optimization of job allocation, wherein each of the one or plurality of jobs uses, for execution of the job, one or more kinds of calculation resources included in an allocation target server of the job, the monitoring result information includes, for each of the one or plurality of jobs, information that indicates a resource use rate of each of the one or more kinds of calculation resources included in the allocation target server of the job and used for execution of the job per duration, and the allocation optimization support processing includes determining, for each of the one or plurality of jobs based on the monitoring result information, a job characteristic compatible with the resource use rate of each of the one or more kinds of calculation resources used by the job in the allocation target server of the job, and selecting, when there is a target job that matches a condition that the allocation target server of the target job is recommended to be changed, an allocation target server of the target job after the change from among one or more servers each having a server characteristic compatible with the determined job characteristic of the target job based on at least one of an execution duration length and resource use rates of various calculation resources, which are specified for the target job based on the monitoring result information, a use cost of each of the one or more servers, and resource amounts of various calculation resources in each of the one or more servers.

11. A non-transitory computer-readable storage medium storing a computer program configured to cause a computer to:

monitor one or a plurality of jobs allocated to one or more of a plurality of servers;

and periodically or non-periodically perform, based on monitoring result information that indicates a result of the monitoring of the one or plurality of jobs, allocation optimization support processing that supports optimization of job allocation, wherein each of the one or plurality of jobs uses, for execution of the job, one or more kinds of calculation resources included in an allocation target server of the job, the monitoring result information includes, for each if the one or plurality of jobs, information that indicates a resource use rate of each of the one or more kinds of calculation resources included in the allocation target server of the job and used for execution of the job per duration, and the allocation optimization support processing includes determining, for each of the one or plurality of jobs based on the monitoring result information, a job characteristic compatible with the resource use rate of each of the one or more kinds of calculation resources used by the job in the allocation target server of the job, and selecting, when there is a target job that matches a condition that the allocation target server of the target job is recommended to be changed, an allocation target server of the target job after the change from among one or more servers each having a server characteristic compatible with the determined job characteristic of the target job based on at least one of an execution duration length and resource use rates of various calculation resources, which are specified for the target job based on the monitoring result information, a use cost of each of the one or more servers, and resource amounts of various calculation resources in each of the one or more servers.

\* \* \* \* \*